(12) United States Patent
Resende et al.

(10) Patent No.: US 8,730,817 B2
(45) Date of Patent: May 20, 2014

(54) METHODS AND APPARATUS TO DETERMINE NETWORK LINK WEIGHTS

(75) Inventors: Mauricio Guilherme de Carvalho Resende, Holmdel, NJ (US); Luciana Salete Buriol, Porto Alegre (BR); Roger S. Reis, Porto Alegre (BR); Marcus Ritt, Porto Alegre (BR)

(73) Assignees: AT&T Intellectual Property I, L.P., Atlanta, GA (US); Universidade Federal do Rio Grande do sul—UFRGS, Porto Alegre, RS (BR)

( * ) Notice: Subject to any disclaimer, the term of this patent is extended or adjusted under 35 U.S.C. 154(b) by 687 days.

(21) Appl. No.: 12/962,359

(22) Filed: Dec. 7, 2010

(65) Prior Publication Data

US 2012/0140636 A1    Jun. 7, 2012

(51) Int. Cl.
*H04L 12/26*      (2006.01)

(52) U.S. Cl.
USPC ........................... 370/238; 370/252; 370/351

(58) Field of Classification Search
USPC .............. 370/229, 230, 230.1, 235, 238, 252, 370/254, 255, 351
See application file for complete search history.

(56) References Cited

U.S. PATENT DOCUMENTS

| | | | |
|---|---|---|---|
| 6,646,989 B1* | 11/2003 | Khotimsky et al. | 370/238 |
| 6,704,320 B1* | 3/2004 | Narvaez et al. | 370/408 |
| 6,996,065 B2* | 2/2006 | Kodialam et al. | 370/238 |
| 8,437,259 B1* | 5/2013 | Nucci et al. | 370/238 |
| 2005/0286426 A1* | 12/2005 | Padhye et al. | 370/238 |
| 2007/0076615 A1* | 4/2007 | Lea et al. | 370/238 |
| 2008/0062891 A1* | 3/2008 | Van der Merwe et al. | 370/254 |
| 2010/0017538 A1 | 1/2010 | Andrade et al. | |
| 2010/0188971 A1* | 7/2010 | Chiang | 370/225 |
| 2012/0140636 A1* | 6/2012 | Resende et al. | 370/238 |
| 2012/0281586 A1* | 11/2012 | Chase et al. | 370/252 |

OTHER PUBLICATIONS

Reis et al., "A Biased Random-Key Genetic Algorithm for OSPF and DEFT Routing to Minimize Network Congestion," AT&T Labs Research Technical Report, Dec. 15, 2009, (21 pages).

Bean, J. C., "Genetic Algorithms and Random Keys for Sequencing and Optimization," ORSA Journal on Computing, vol. 6, No. 2. Spring 1994, (7 pages).

Bley, A. et al., "Approximability of Unsplittable Shortest Path Routing Problem," (expanded version of "On the Approximability of the Minimum Congestion Unsplittable Shortest Path Routing Problem" in the Proceedings of 11th Conference on Integer Programming and Combinatorial Optimization (IPCO 2005) Berlin, Germany), vol. 3509/2005 of Lecture Notes in Computer Science, Berlin, Germany, Mar. 2006, (36 pages).

(Continued)

*Primary Examiner* — Jeffrey M Rutkowski
*Assistant Examiner* — Nguyen Ngo
(74) *Attorney, Agent, or Firm* — Hanley, Flight & Zimmerman, LLC

(57) ABSTRACT

Methods and apparatus to determine network link weights are disclosed. An example method disclosed herein to determine link weights for routing in a communication network comprises iteratively updating a plurality of vectors using a genetic algorithm, the vectors including a plurality of individual values decodable into possible link weights, and decoding a first one of the vectors updated using the genetic algorithm into a first plurality of link weights providing a possible routing of a load through the communication network, the load to be split among a plurality of paths having respective path lengths determined from the plurality of link weights, at least two of the paths having different path lengths.

18 Claims, 19 Drawing Sheets

(56) References Cited

OTHER PUBLICATIONS

Brostrom, P. et al., "Multiobjective Design of Survivable IP Networks," Annals of Operations Research, Springer Science + Business Media, LLC, Aug. 22, 2006, (19 pages).

Buriol, L.S. et al., "A Hybrid Genetic Algorithm for the Weight Setting Problem in OSPF/IS-IS Routing," Wiley Interscience, Wiley Periodicals, Inc., Mar. 2005, (21 pages).

Ericsson, M., et al., "A Genetic Algorithm for the Weight Setting Problem," OSPF Routing. Journal of Combinatorial Optimization, Oct. 9, 2001, (35 pages).

Fortz, B. et al, "Internet Traffic Engineering by Optimizing OSPF Weights," INFOCOM 2000, 2000, (10 pages).

Fortz, B. et al, "Increasing Internet Capacity Using Local Search," Jun. 13, 2000, (59 pages).

Girao-Silva, R. et al., "Hierarchical Multiobjective Routing in MPLS Networks with Two Service Classes: A Meta-Heuristic Solution" Journal of Telecommunications and Information Technology, Mar. 2009, (18 pages).

Goncalves, J. et al., "Biased Random-Key Genetic Algorithms for Combinatorial Optimization," AT&T Labs Research Technical Report, Oct. 8, 2009, (26 pages).

Konak, A. et al., "Multi-objective optimization using genetic algorithms: A tutorial," Reliability Engineering and System Safety, Elsevier Ltd., Jan. 9, 2006, (16 pages).

Ramalingam, G. et al., An Incremental Algorithm for a Generalization of the Shortest-Path Problem, University of Wisconsin—Madison, (35 pages).

Spears, W.M. et al., "On the Virtues of Parameterized Uniform Crossover," 1991, (7 pages).

Wang, N. et al., "An Overview of Routing Optimization for Internet Traffic Engineering," IEEE Communications Surveys & Tutorials, 1st Quarter, vol. 10, No. 1, 2008, (21 pages).

Xu, D. et al., "DEFT: Distributed Exponentially-weighted Flow Splitting," May 2007, (9 pages).

Xu, D. et al., "Link-State Routing with Hop-by-Hop Forwarding Can Achieve Optimal Traffic Engineering," 2008, (9 pages).

Ben-Ameur, W. et al., "Internet Routing and Related Topology Issues," SIAM Journal on Discrete Mathematics, vol. 17, No. 1, Jan. 14, 2003, (32 pages).

Holmberg, K. et al., "Optimization of Internet Protocol Network Design and Routing," Networks, vol. 43(1), Wiley Periodicals, Inc., 2004, (15 pages).

Moscato, P., "Memetic Algorithms," P.M. Pardalos and M.G.C. Resende, editors, Handbook of Applied Optimization, Oxford University Press, 2002, (12 pages).

* cited by examiner

510 → procedure CostEvalDEFT($G = (V,E), T, D, (w_e)_{e \in E}, g$)
801    for $\forall t \in T$
802      $d$ = ReverseDijkstra($t, w$)
803      $G^t$ = ComputeShortestPathGraph($G, w, d$)
804      [ComputePartialLoads($d, G^t, D$)]
805        $H$ = sorted nodes in decreasing order of distances
806        for each $u \in H$
807          $\Gamma_{total} = 0$
808          for each $v \in OUT(u)$
809            if $d_u^t > d_v^t$ and $h_{u,v}^t \leq g$ then
810              $h_{u,v}^t = d_v^t + w_{u,v} - d_u^t$
811              $\Gamma_{total} = \Gamma_{total} + e^{-h_{u,v}^t}$
812            endif
813          endfor
814          $f = (D_{u,t} + \sum_{v:(v,u) \in G^t} f_{v,u}^t)/\Gamma_{total}$
815          for each $v \in OUT(u)$
816            if $d_u^t > d_v^t$ and $h_{u,v}^t \leq g$ then
817              $\gamma = e^{-h_{u,v}^t}$
818              $f_{u,v}^t = f\gamma$
819            endif
820          endfor
821        endfor
822      [end of ComputePartialLoads]
823      for each $(u,v) \in E$
824        $f_{u,v} = f_{u,v} + f_{u,v}^t$
825    endfor
826    $\Phi = \sum_{(u,v) \in E} \phi(u,v)$
end CostEvalDEFT.

```
procedure FlowDistributionDEFT(G = (V,E),T,D,(w_e)_{e∈E},(d_e)_{e∈E},Δ,g)
1101    d_old = d
1102    for ∀t ∈ T
1103        d = ReverseDijkstra(G,t,w)
1104        G^s = ComputeShortestPathGraph(G,w,d)
1105        H_{d,d_old} = ∅ // order according to equation (6)
1106        for each u ∈ V
1107            condition1 = condition2 = false
1108            for each v ∈ OUT(u)
1109                if d^t_v = d_old,v + Δ then condition1 = true
1110                if d^t_v = d_old,v then condition2 = true
1111            endfor
1112            if condition1 and condition2 then InsertHeap(H_{d,d_old}, u)
1113        endfor
1114        for each p ∈ H_{d,d_old}
1115            for each q ∈ OUT(p)
1116                if q ∉ H_{d,d_old} then InsertHeap(H_{d,d_old}, q)
1117            endfor
1118        endfor
1119        for each u ∈ H_{d,d_old}
1120            Γ_total = 0
1121            for each v ∈ OUT(u)
1122                if d^t_u > d^t_v and h^t_{u,v} ≤ g then
1123                    h^t_{u,v} = d^t_v + w_{u,v} − d^t_u
1124                    Γ_total = Γ_total + e^{−h^t_{u,v}}
1125                endif
1126            endfor
1127            f = D_{u,t} + Σ_{v:(v,u)∈G^s} f^t_{(v,u)})/Γ_total
1128            for each v ∈ OUT(u)
1129                if d^t_u > d^t_v and h^t_{u,v} ≤ g then
1130                    γ = e^{−h^t_{u,v}}
1131                    f^t_{u,v} = fγ
1132                else
1133                    f^t_{u,v} = 0
1134                endif
1135            endfor
1136        endfor
1137        for each (u,v) ∈ E
1138            f_{u,v} = f_{u,v} + f^t_{u,v}
1139    endfor
1140    Φ = Σ_{(u,v)∈E} φ(u,v)
end FlowDistributionDEFT
```

FIG. 11

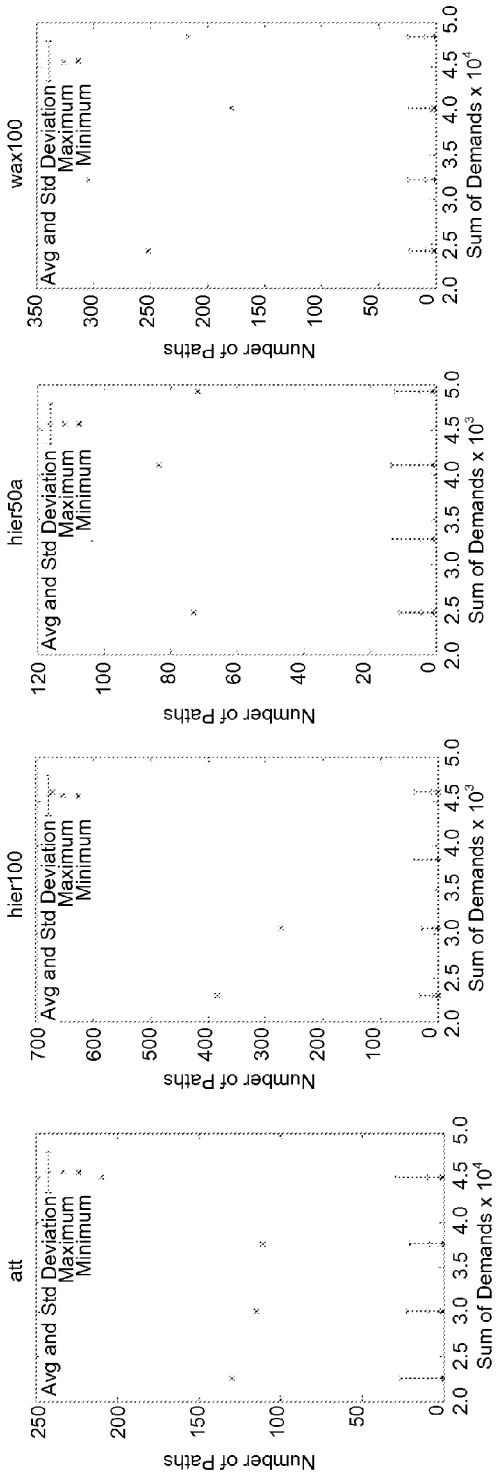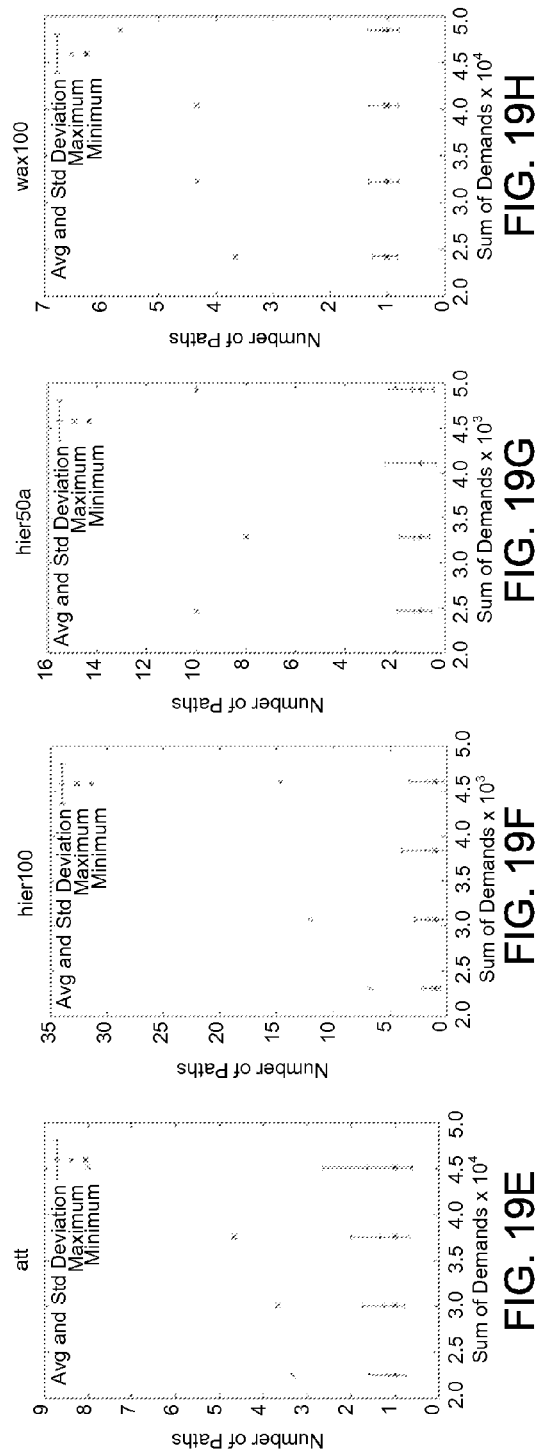

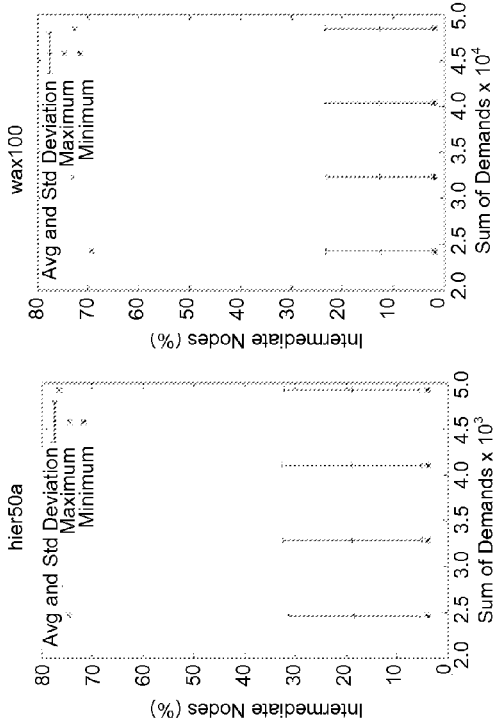
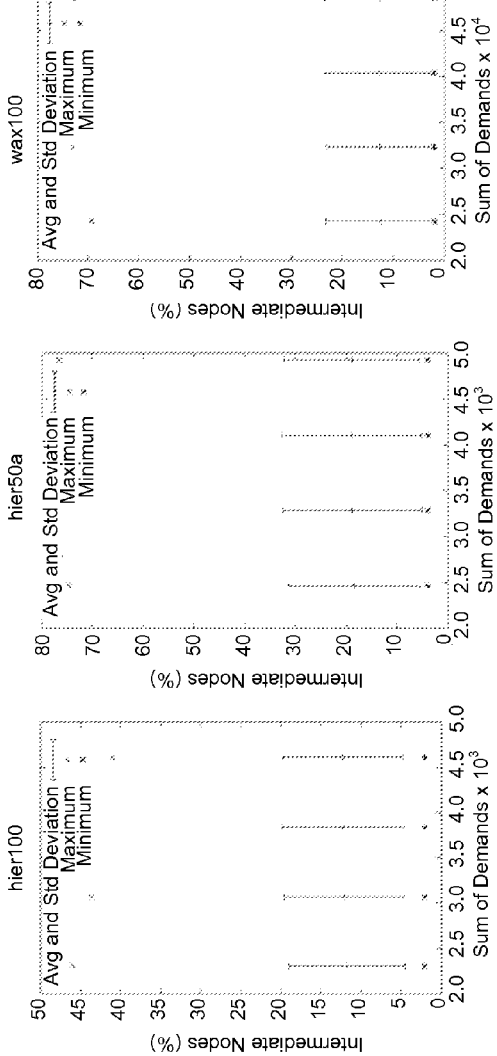
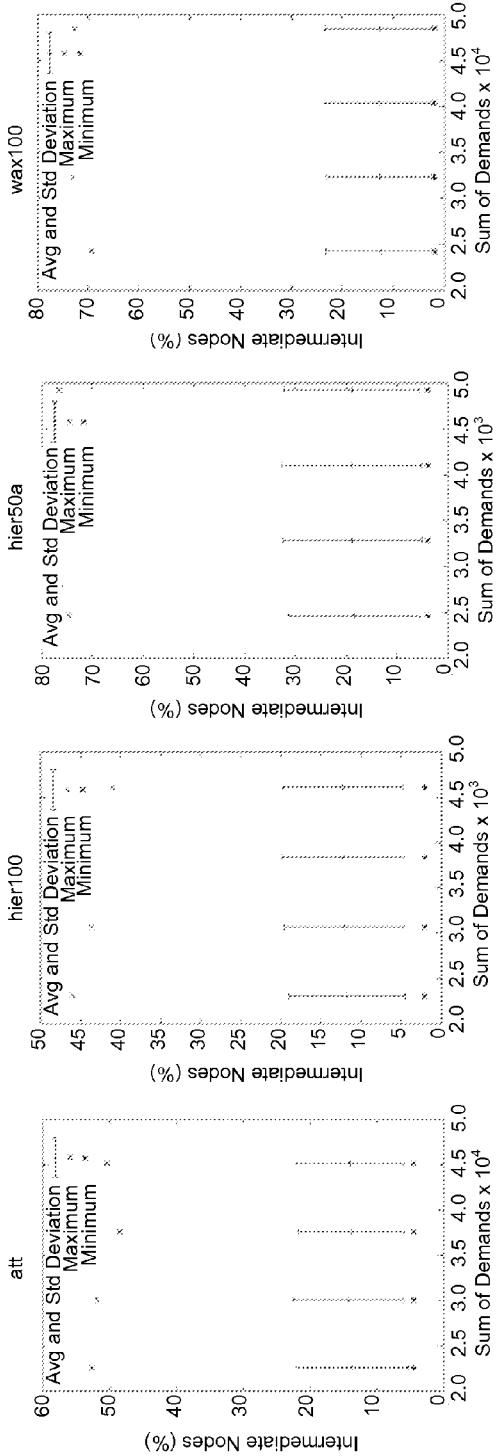
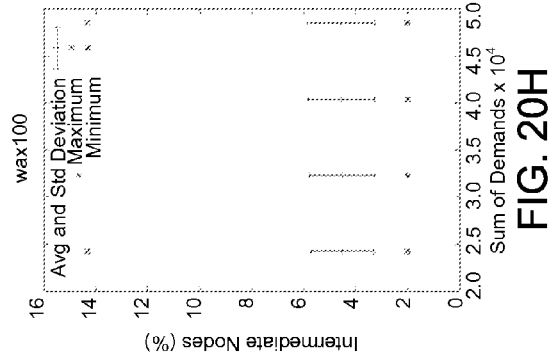
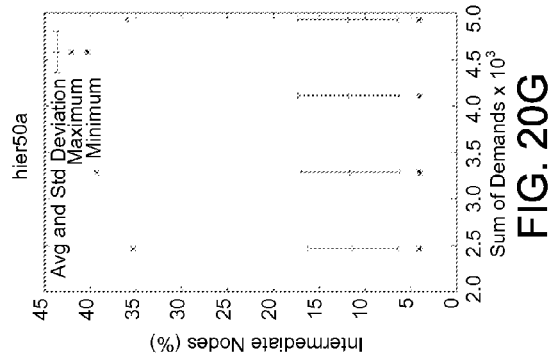
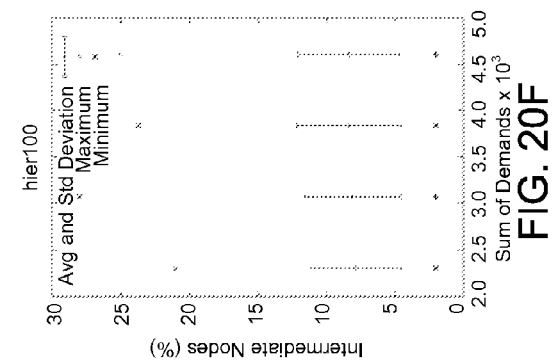
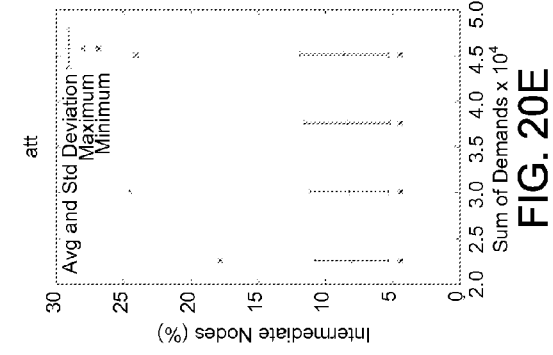
FIG. 20A  FIG. 20B  FIG. 20C  FIG. 20D
FIG. 20E  FIG. 20F  FIG. 20G  FIG. 20H

METHODS AND APPARATUS TO DETERMINE NETWORK LINK WEIGHTS

FIELD OF THE DISCLOSURE

This disclosure relates generally to communication networks and, more particularly, to methods and apparatus to determine network link weights.

BACKGROUND

The Internet includes multiple autonomous systems, each one using an interior gateway protocol to control routing within the autonomous system. Interior gateway protocols, such as OSPF (Open Shortest Path First) and DEFT (Distributed Exponentially-Weighted Flow spliTting), send flow through forward links towards a destination node. OSPF routes only on shortest-weight paths, whereas DEFT sends flow on all forward links, but with an exponential penalty on longer paths. Finding suitable weights for protocols such as these is known as the weight setting problem.

BRIEF DESCRIPTION OF THE DRAWINGS

FIG. 8 illustrates an example pseudocode listing corresponding to the flowchart of FIG. 7.

FIG. 11 illustrates an example pseudocode listing corresponding to the flowchart of FIG. 10.

FIGS. 12-20H illustrate example performance results for the link weight solver of FIG. 4.

DETAILED DESCRIPTION

Figure 1:
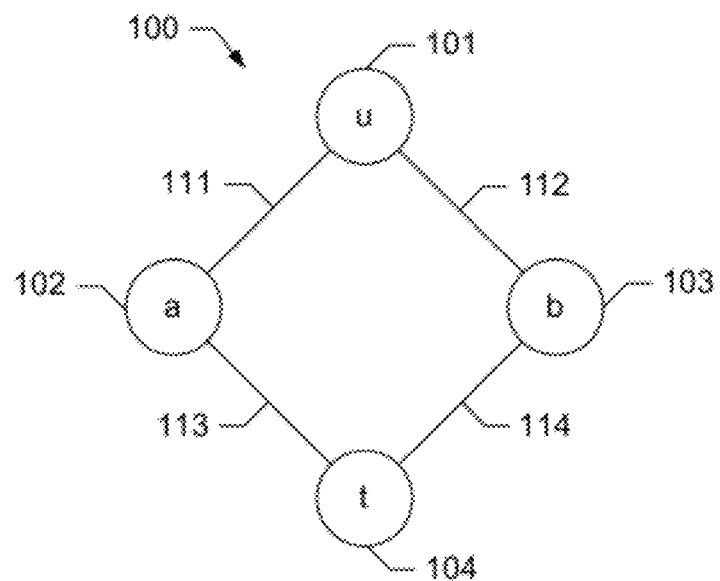
FIG. 1 is block diagram of an example communication network represented as a graph comprising nodes and links.

Methods, apparatus and articles of manufacture to determine network link weights are disclosed herein. Example methods to determine link weights for routing in a communication network as described herein include iteratively updating a plurality of vectors using a genetic algorithm, where each vector includes a plurality of individual values decodable into possible link weights. Such example methods also include decoding a vector updated using the genetic algorithm into a plurality of link weights providing a possible routing of a load through the communication network. For example, the plurality of link weights are used to split the load among a plurality of paths having respective path lengths determined from the plurality of link weights, with at least some of the paths having different path lengths (e.g., such as in the case of DEFT-based routing). In some examples, such methods further include determining a routing cost (also referred to as a fitness) associated with each plurality of link weights decoded after each iteration of the genetic algorithm, and when a processing convergence is detected (e.g., such as when no further change in the minimum routing cost is observed), selecting the plurality of link weights associated with the minimum routing cost for performing routing in the communication network. Example genetic algorithms for iteratively updating the plurality of vectors to determine respective pluralities of link weights are described in greater detail below.

In some examples, the methods described herein also perform a local search procedure to attempt to improve a plurality of link weights decoded after an iteration of the genetic algorithm. Examples of such a local search procedure include incrementing a link weight of a plurality of link weights decoded from a vector updated using the genetic algorithm, and determining whether incrementing the link weight of the plurality of link weights improved a routing cost associated with the plurality of link weights. If the first DEFT routing cost is improved, such example methods again increment the link weight of the plurality of link weights and determine whether the routing cost is further improved. However, if the first DEFT routing cost is not improved, such example methods can increment other link weights of the plurality of link weights and determine whether associated routing costs are improved, with the procedure terminating when no improvement is observed after examining a number of link weights of the plurality of link weights.

Various techniques for solving the weight setting problem have been proposed for OSPF routing. Such techniques include employing genetic algorithms to determine a set of link weights that reduce or substantially minimize a routing cost for OSPF routing. However, it is believed that genetic algorithms have not been used to solve the weight setting problem for DEFT link weights. As such, the example methods, apparatus and articles of manufacture disclosed herein overcome this deficiency in the art by utilizing genetic algorithms to solve the weight setting problem for DEFT link weights. Additionally, the example methods, apparatus and articles of manufacture disclosed herein can determine a set of link weights that reduces or substantially minimizes a routing cost (also referred to a cost function, an objective function, a solution fitness, a network congestion function, etc.) under DEFT routing or, more generally, any routing technique in which loads can be split unevenly among paths having different path lengths determined from link weights. Furthermore, the example methods, apparatus and articles of manufacture disclosed herein can yield integer link weights supportable by today's network routing devices, thereby enabling DEFT routing to be employed in existing communication networks.

Turning to the figures, an example network graph 100 representative of an example communication network is illustrated in FIG. 1. As noted above, the Internet includes many autonomous systems, each one using an Interior Gateway Protocol (IGP) to control routing within the autonomous system (AS). The topology of an Internet network can be represented as a directed graph, such as the graph 100 of FIG. 1, which includes a set of routers (represented as a set of example nodes 101-104) and a set of communication links (represented as a set of example arcs 111-114). A set of routers under the control of one or more network operators who apply the same routing policy is what characterizes an AS. Given a demand matrix containing an amount of traffic to be sent between all pairs of routers, IGP routing protocols establish rules on how loads will be sent from sources to destinations within the AS.

A flexible routing model is the fractional multi-commodity flow routing (referred to herein as OPT routing). This routing model attempt to make the best possible use of network link capacities. However, it is difficult to implement this protocol in practice because of arbitrarily long paths, and the arbitrarily small demand loads that can be routed on high-capacity links. Therefore, telecommunication network protocols are typically based on routing models that are less efficient with respect to capacity utilization, but easier to implement in practice.

Among existing IGP routing protocols, there are a few that have been long used in practice, such as the OSPF routing protocol. Other IGP protocols have been recently proposed and are not yet implemented in real networks, such as the DEFT routing protocol. Both OSPF and DEFT are link-state routing protocols. These protocols allow a network operator to calculate paths on the network by setting adequate link weights to balance loads traversing the network. The loads are then sent through paths from sources to destinations, and quantities such as network congestion, link utilization, delay, etc., can be measured. The problem of determining proper weights to reduce, improve or substantially optimize an objective function or multiple conflicting objectives on these metrics is known as the weight setting problem (WSP).

An objective of intradomain traffic engineering is the efficient utilization of the available network resources within an AS under traffic constraints. The traffic constraints can include QoS (Quality of Service) features, such as, but not limited to, delay, jitter, number of hops, cost, etc. With these aims, the weight setting problem has been studied for almost a decade for OSPF routing. In OSPF, integer link weights are set by the network operator. The flow is routed through the shortest paths, with traffic being split evenly, in each node, among all outgoing shortest path links. An objective is to determine link weights such that, if the traffic is routed according to the protocol, then congestion is minimized. This single-objective routing, however, has its limitations. For example, it does not deal directly with QoS requirements that one may also want to optimize. Multi-objective routing can help address these requirements.

A wide range of other link-state routing protocols exist. One of these protocols is IS-IS (Intermediate System to Intermediate System). The IS-IS protocol considers similar rules as OSPF, with one difference being that OSPF is an Internet protocol, whereas IS-IS is natively an ISO (International Organization for Standardization) network layer protocol.

DEFT is another, recent IGP routing protocol. DEFT considers not only shortest paths for routing, but also directs flow through all forward paths, with exponential costs being associated with longer paths. Furthermore, DEFT weights are real numbers, whereas OSPF weights are integers. PEFT (Penalizing Exponential Flow-spliTting) is a path-based routing protocol that splits traffic over multiple paths with an exponential penalty on longer paths. One difference between the DEFT and PEFT protocols is that, in terms of flow splitting, DEFT is a link-based protocol, whereas PEFT is a path-based protocol. In PEFT, the outgoing flow at any node is split among all shortest paths to a destination node, whereas in DEFT, the outgoing flow is split among all forwarding links. In PEFT, if an outgoing shortest path link belongs to more than one shortest path, this link receives more flow than a shortest path link that belongs to only one shortest path to the destination node.

The example methods, apparatus and articles of manufacture described herein solve the weight setting problem for DEFT weights using a biased random key genetic algorithm (BRKGA). Furthermore, the example methods, apparatus and articles of manufacture described herein can support implementations of the DEFT protocol employing integer weights, instead of real number weights. A benefit of implementing the DEFT protocol with integer weights is that routers typically used in practice allow only integer weights and, therefore, allows the DEFT protocol with integer weights as described herein to be employed in existing communication networks. In the remainder of this disclosure, DEFT with integer weights is also referred to as int-DEFT.

Example methods, apparatus and articles of manufacture to solve the weight setting problem for DEFT weights using a BRKGA are described as follows. First, a description of the general communication network routing problem is provided. Then, the OSPF and DEFT protocols are described in detail. The BRKGA framework for combinatorial optimization is then reviewed. Adapting BRKGA for the OSPF and DEFT weight setting problems is then disclosed, and example performance results are provided.

To develop the general routing problem for a communication network, let G=(V, E) be a directed graph (such as the graph 100) modeling a network with a set of routers V (e.g., represented by the example nodes 101-104) and links E ⊂V×V (e.g., represented by the example arcs 111-114). Each link $(u, v) \in E$ has a flow capacity $c_{u,v}$. Let D be a demand matrix, where $D_{u,v}$ denotes the traffic flow from source node u to target node v for u, v∈V. Let T⊂V be the subset of all target nodes in V, i.e. $T=\{v \in V: D_{u,v} > 0, u \in V\}$. The general routing problem is to find the flows $f_{u,v}$ on each arc $(u, v) \in E$ such that an appropriate objective function is minimized and all demands are delivered from their source nodes to their target nodes.

An example of an objective function (also referred as a routing cost, a solution fitness, a network congestion function, etc.) to be minimized is given by Equation 1:

$$\sum_{(u,v) \in E} \Phi(f_{u,v}, c_{u,v}), \qquad \text{Equation 1}$$

where Φ is the network-link cost function, which depends on the current flow and the link capacity. An example of Φ is the piecewise linear function given by Equation 2:

$$\Phi(f_{u,v}, c_{u,v}) = \begin{cases} f_{u,v} & \text{if } f_{u,v}/c_{u,v} < 1/3, \\ 3f_{u,v} - 2/3c_{u,v} & \text{if } 1/3 \le f_{u,v}/c_{u,v} < 2/3, \\ 10f_{u,v} - 16/3c_{u,v} & \text{if } 2/3 \le f_{u,v}/c_{u,v} < 9/10, \\ 70f_{u,v} - 178/3c_{u,v} & \text{if } 9/10 \le f_{u,v}/c_{u,v} < 1, \\ 500f_{u,v} - 1468/3c_{u,v} & \text{if } 1 \le f_{u,v}/c_{u,v}, 11/10, \\ 5000f_{u,v} - 16318/3c_{u,v} & \text{if } 11/10 \le f_{u,v}/c_{u,v}. \end{cases} \qquad \text{Equation 2}$$

Figure 2:
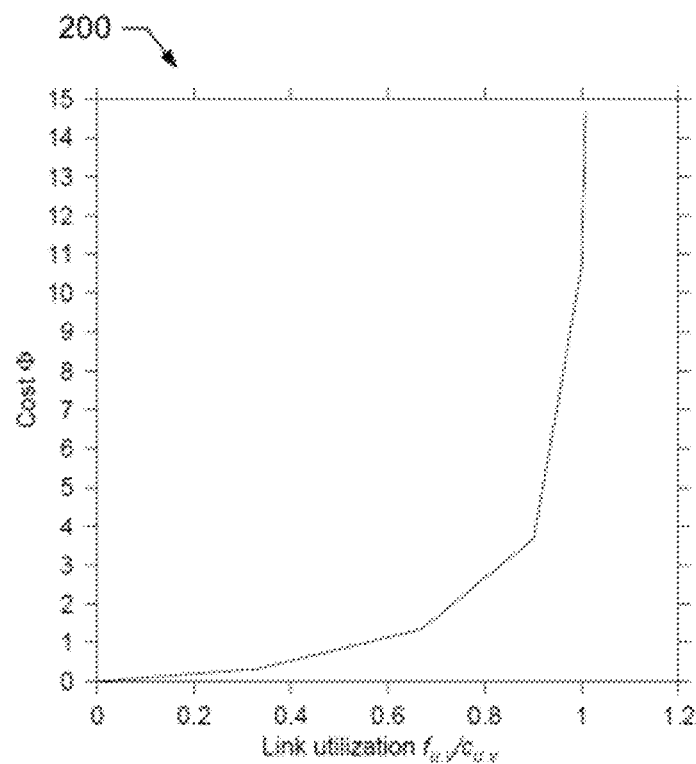
FIG. 2 is a plot of an example link routing cost that is a function of link utilization.

A plot 200 of the link cost $\Phi$ of Equation 2 as a function of the link utilization $f_{u,v}/c_{u,v}$ is illustrated in FIG. 2.

Let $f_{u,v}^t$ be the flow with destination node t on link (u, v). Then, at all intermediate nodes $v \neq t$ any resulting flow must respect flow conservation constraints given by Equation 3:

$$\sum_{w:(v,w) \in E} f_{v,w}^t - \sum_{u:(u,v) \in E} f_{u,v}^t = D_{v,t} \qquad \text{Equation 3}$$

and the individual flow aggregation constraint given by Equation 4:

$$f_{u,v} = \sum_{t \in T} f_{u,v}^t. \qquad \text{Equation 4}$$

As the constraints and the objective function $\Phi$ are linear, an optimum solution can be obtained by solving the linear program OPT defined by Equation 1, Equation 3, Equation 4, and the non-negativity constraints $f_{u,v}^t \geq 0$ and $f_{u,v} \geq 0$, for all (u, v)$\in$E and t$\in$T. The optimal solution of OPT is a lower bound for the cost of any routing protocol.

The OSPF protocol, in contrast with the OPT solution, uses weights $w_{u,v}$ on links (u, v)$\in$E (e.g., represented by the example arcs 111-114 in FIG. 1) to determine the flow distribution of demands. The weights are 16-bit integers in the range [0, $2^{16}$-1]. Each router (e.g., represented by the example nodes 101-104 of FIG. 1) maintains a link-state database of the network topology and the weights, and regularly exchanges state information with other routers in the same AS to keep the database up-to-date. To route incoming traffic, a router maintains a shortest path graph using the weights as distances to all known target nodes within the AS. The outgoing traffic of a node u with destination t is split equally among all outgoing links on shortest paths to t.

The DEFT protocol relaxes the shortest-path-only restriction of the OSPF protocol and also allows routing on non-shortest paths. Under conventional DEFT routing, the outgoing traffic of a node u is split proportionally among all forward links to a target node t. Links belonging to non-shortest paths receive exponentially greater penalties, and consequently carry less flow.

Formally, to determine how load flows are to be split under DEFT routing, let $d_u^t$ be the distance from node u to destination node t. Then $h_{u,v}^t = d_v^t + w_{u,v} - d_u^t$ is the difference between the length of the shortest path and the length of the path traversing link (u, v). The non-normalized flow fraction $\Gamma$ in the direction to target node t traversing link (u, v) is defined by Equation 5:

$$\Gamma(h_{u,v}^t) = \begin{cases} e^{-h_{u,v}^t} & \text{if } d_u^t > d_v^t \\ 0 & \text{otherwise} \end{cases} \qquad \text{Equation 5}$$

Equation 5 is then used to calculate the fraction of the total flow for each outgoing link (u, v) of u to be $\Gamma(h_{u,v}^t)/\Sigma_{w:(u,w) \in E} \Gamma(h_{u,w}^t)$. It can be shown that, in terms of total link cost and maximum utilization, there always exists a weight setting such that DEFT has a smaller total cost than OSPF.

Figure 3:
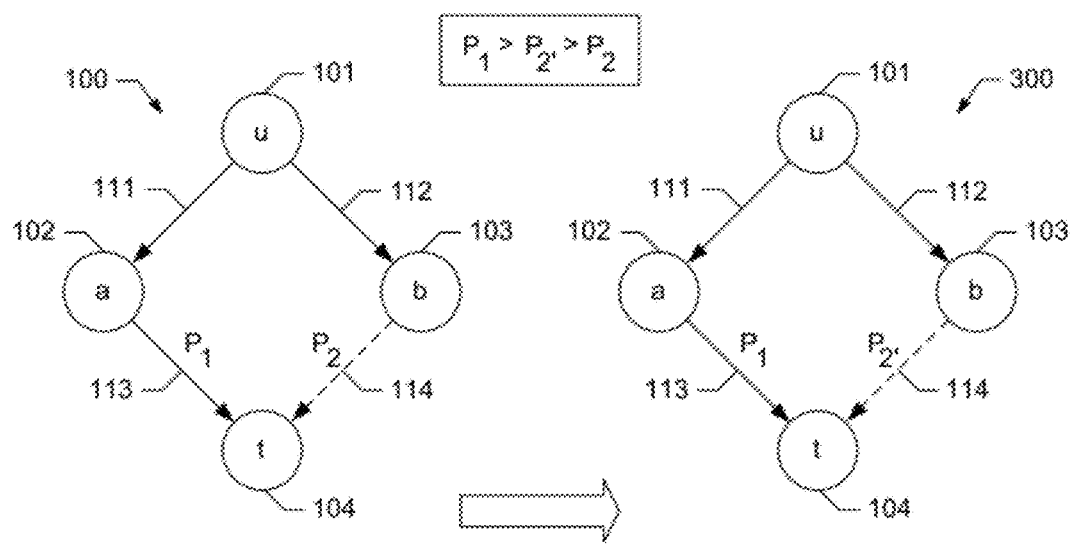
FIG. 3 illustrates an example effect of varying a link weight in the network graph of FIG. 1.

FIG. 3 illustrates an example of increasing a link weight in the network graph 100 to demonstrate differences between the OSPF and DEFT routing protocols. In the example of FIG. 3, the graph 100 is modified to yield an example graph 300 by increasing the link weight for arc (b, t) (having label 114 in FIG. 3) from weight $P_2$ (in network graph 100) to weight $P'_2$ (in network graph 300). Suppose $P_1 > P'_2 > P_2 > 0$ and arc (u, a) (having label 111 in FIG. 3) and arc (u, b) (having label 112 in FIG. 3) have the same positive weight. In OSPF, the traffic from node u (having label 101 in FIG. 3) to t (having label 104 in FIG. 3) is routed through the shortest path u-b-t (i.e., from node 101, along link 112 to node 103, and then along link 114 to node 114). Node a (having label 102 in FIG. 3) does not receive any flow. The weight change does not alter this scenario. However, when routing with DEFT, node a receives a fraction of the traffic and the change in the weight of arc (b, t) causes a change of this fraction. Increasing the weight of (b, t) causes a decrease in the amount of flow routed through b, and a larger part of the flow is now routed through a.

Figure 4:
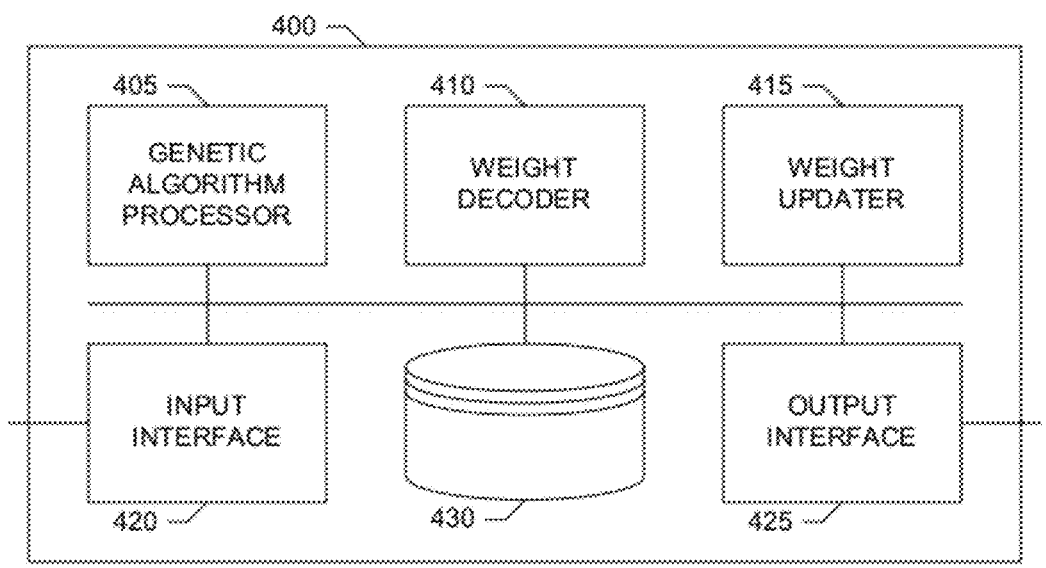
FIG. 4 is a block diagram of an example link weight solver employing a genetic algorithm as described herein to determine link weights for performing routing in the communication network of FIG. 1.

An example link weight solver 400 capable of solving the weight setting problem for DEFT weights (and/or OSPF weights) is illustrated in FIG. 4. The link weight solver 400 includes an example genetic algorithm processor 405 to implement a genetic algorithm for iteratively updating a population of vectors (e.g., also referred to as evolving the population of vectors), which are decoded into possible link weights. In some examples, the genetic algorithm processor 405 continues to update the population of vectors until the decoded link weights converge to a solution yielding a minimum (or local minimum) of the routing cost (also referred to as the solution fitness) given by Equation 1. Examples of genetic algorithms that can be implemented by the genetic algorithm processor 405 are described in greater detail below.

The link weight solver 400 also includes an example weight decoder 410 to decode the population of vectors updated by the genetic algorithm processor 405 into respective sets of possible link weights $w_{u,v}$ for the links (u, v) in the network. The weight decoder 410 also determines the routing cost (or fitness) of Equation 1 associated with each set of possible link weights. The weight decoding and cost determination procedure performed by the weight decoder 410 can depend upon the type of weights being determined, such as DEFT weight, OSPF weights, etc. Example processing performed by the weight decoder 410 is described in greater detail below.

The link weight solver 400 further includes an example weight updater 415 to perform a local search to modify values of one or more weights in each set of possible link weights decoded by the weight decoder 410 to attempt to improve the cost (or fitness) associated with each set of possible link weights. In some examples, the weight updater 415 increments one weight in a set of possible link weights, and determines whether incrementing this weight improved the routing cost (or fitness) associated with this set of possible link weights. If the routing cost is improved, this same link weight is incremented again to determine whether the routing cost is further improved. However, if incrementing the weight does not improve the routing cost, other weights in this set of possible link weights are incremented and the resulting routing cost is again examined. In some examples, this local search procedure terminates for a particular set of possible link weights when no routing cost improvement is observed after incrementing some number (e.g., specified as a configuration parameter) of the link weights in the set. In the case of determining DEFT weights, the weight updater 415 can implement a dynamic flow update algorithm to determine the new routing cost resulting from incrementing a weight in a set of possible link weights. Example processing performed by the weight updater 415 is described in greater detail below.

An example input interface 420 is also included in the link weight solver 400 to receive input information, configuration parameters, etc., for use by one or more of the genetic algorithm processor 405, the weight decoder 410 and the weight updater 415. Examples of the information and parameters received or otherwise obtained by the input interface 420 include, but are not limited to, a graph G describing the topology of the routers V and links E forming the communication network, the target nodes T of the network, the demand matrix D specifying the load (or demand) to be conveyed from source nodes to the target nodes in the network, configuration parameters for the genetic algorithm implemented by the genetic algorithm processor 405, etc. The input interface 420 can be implemented by any type of interface technology, processor, etc., such as the interface circuit 2124 and input device(s) 2126 of the processing system 2100, which is described in greater detail below in connection with FIG. 21.

An example output interface 425 is included in the link weight solver 400 to output or otherwise provide the solution for the set of link weights as determined by the genetic algorithm processor 405, the weight decoder 410 and the weight updater 415. In some examples, the output interface 425 also provides the routing cost (or fitness) associated with this resulting set of link weights. The output interface 425 can be implemented by any type of interface technology, processor, etc., such as the interface circuit 2124 and input device(s) 2126 of the processing system 2100, which is described in greater detail below in connection with FIG. 21.

The link weight solver 400 further includes storage 430 for storing the sets of possible link weights, the set of link weights determined to be the solution to the weight setting problem, the input/configuration information, etc. The storage 430 can be implemented using any type of storage or memory, such as the mass storage device 2130 and/or the volatile memory 2118 of the processing system 2100, which is described in greater detail below in connection with FIG. 21.

While an example manner of implementing link weight solver 400 has been illustrated in FIG. 4, one or more of the elements, processes and/or devices illustrated in FIG. 4 may be combined, divided, re-arranged, omitted, eliminated and/or implemented in any other way. Further, the example genetic algorithm processor 405, the example weight decoder 410, the example weight updater 415, the example input interface 420, the example output interface 425, the example storage 430 and/or, more generally, the link weight solver 400 of FIG. 4 may be implemented by hardware, software, firmware and/or any combination of hardware, software and/or firmware. Thus, for example, any of the example genetic algorithm processor 405, the example weight decoder 410, the example weight updater 415, the example input interface 420, the example output interface 425, the example storage 430 and/or, more generally, the example link weight solver 400 could be implemented by one or more circuit(s), programmable processor(s), application specific integrated circuit(s) (ASIC(s)), programmable logic device(s) (PLD(s)) and/or field programmable logic device(s) (FPLD(s)), etc. When any of the appended apparatus claims are read to cover a purely software and/or firmware implementation, at least one of the example link weight solver 400, the example genetic algorithm processor 405, the example weight decoder 410, the example weight updater 415, the example input interface 420, the example output interface 425 and/or the example storage 430 are hereby expressly defined to include a tangible computer readable medium such as a memory, digital versatile disk (DVD), compact disk (CD), etc., storing such software and/or firmware. Further still, the example link weight solver 400 of FIG. 4 may include one or more elements, processes and/or devices in addition to, or instead of, those illustrated in FIG. 4, and/or may include more than one of any or all of the illustrated elements, processes and devices.

Flowcharts and pseudocode listings representative of example machine readable instructions that may be executed to implement the example link weight solver 400, the example genetic algorithm processor 405, the example weight decoder 410, the example weight updater 415, the example input interface 420, the example output interface 425 and/or the example storage 430 are shown in FIGS. 5-8 and 10-11. In these examples, the machine readable instructions represented by each flowchart or pseudocode listing may comprise one or more programs for execution by a processor, such as the processor 2112 shown in the example processing system 2100 discussed below in connection with FIG. 21. Alternatively, the entire program or programs and/or portions thereof implementing one or more of the processes represented by the flowcharts and pseudocode listings of FIGS. 5-8 and 10-11 could be executed by a device other than the processor 2112 (e.g., such as a controller and/or any other suitable device) and/or embodied in firmware or dedicated hardware (e.g., implemented by an ASIC, a PLD, an FPLD, discrete logic, etc.). Also, one or more of the machine readable instructions represented by the flowcharts and pseudocode listings of FIGS. 5-8 and 10-11 may be implemented manually. Further, although the example machine readable instructions are described with reference to the flowcharts and pseudocode listings illustrated in FIGS. 5-8 and 10-11, many other techniques for implementing the example methods and apparatus described herein may alternatively be used. For example, with reference to the flowcharts and pseudocode listings illustrated in FIGS. 5-8 and 10-11, the order of execution of the blocks/lines may be changed, and/or some of the blocks/lines described may be changed, eliminated, combined and/or subdivided into multiple blocks/lines.

As mentioned above, the example processes of FIGS. 5-8 and 10-11 may be implemented using coded instructions (e.g., computer readable instructions) stored on a tangible computer readable medium such as a hard disk drive, a flash memory, a read-only memory (ROM), a CD, a DVD, a cache, a random-access memory (RAM) and/or any other storage media in which information is stored for any duration (e.g., for extended time periods, permanently, brief instances, for temporarily buffering, and/or for caching of the information). As used herein, the term tangible computer readable medium is expressly defined to include any type of computer readable storage and to exclude propagating signals. Additionally or alternatively, the example processes of FIGS. 5-8 and 10-11 may be implemented using coded instructions (e.g., computer readable instructions) stored on a non-transitory computer readable medium, such as a flash memory, a ROM, a CD, a DVD, a cache, a random-access memory (RAM) and/or any other storage media in which information is stored for any duration (e.g., for extended time periods, permanently, brief instances, for temporarily buffering, and/or for caching of the information). As used herein, the term non-transitory computer readable medium is expressly defined to include any type of computer readable medium and to exclude propagating signals. Also, as used herein, the terms "computer readable" and "machine readable" are considered equivalent unless indicated otherwise.

Figure 5:
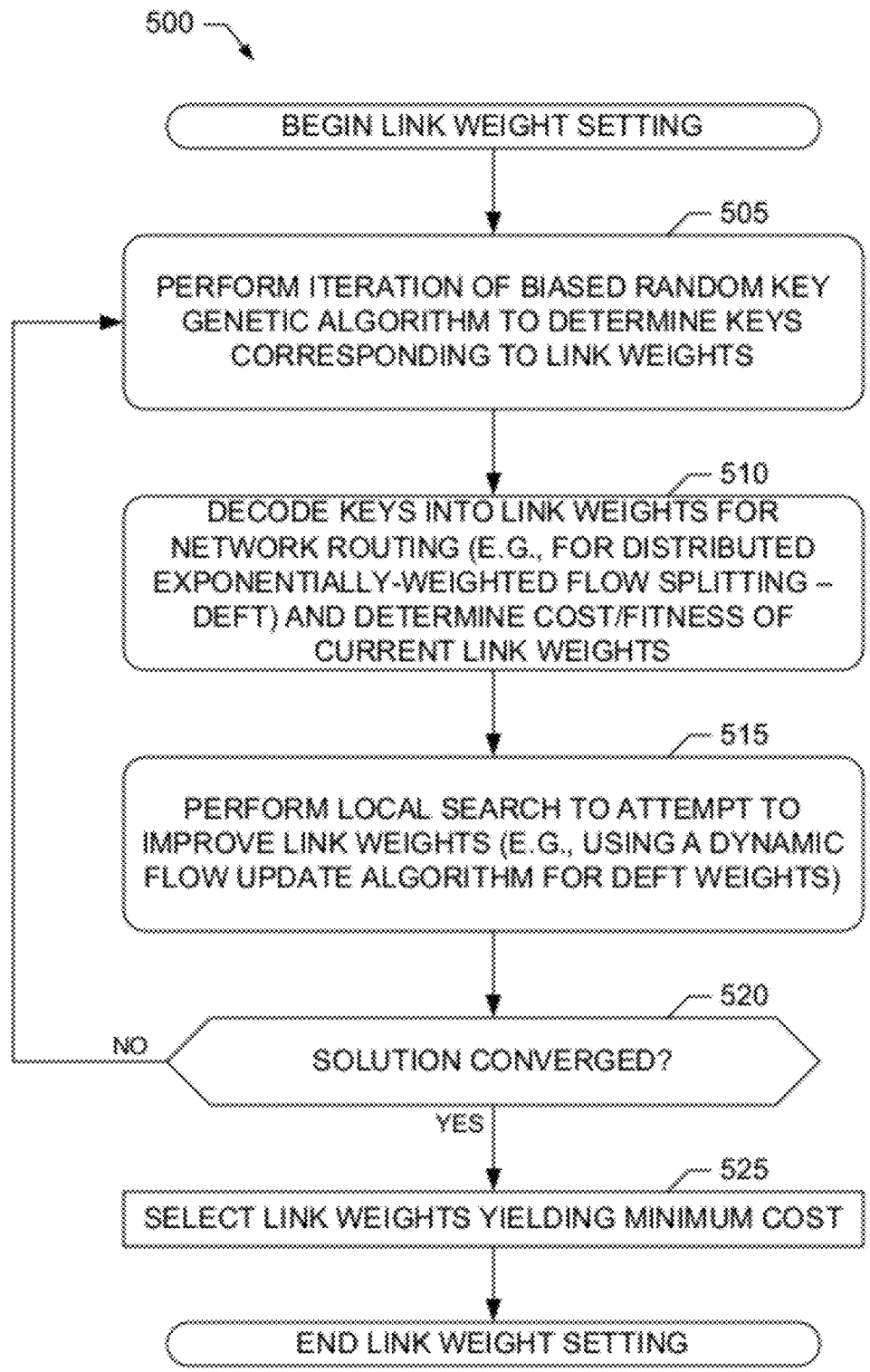
FIG. 5 is a flowchart representative of example machine readable instructions that may be executed to implement the link weight solver of FIG. 4.
Figure 6:
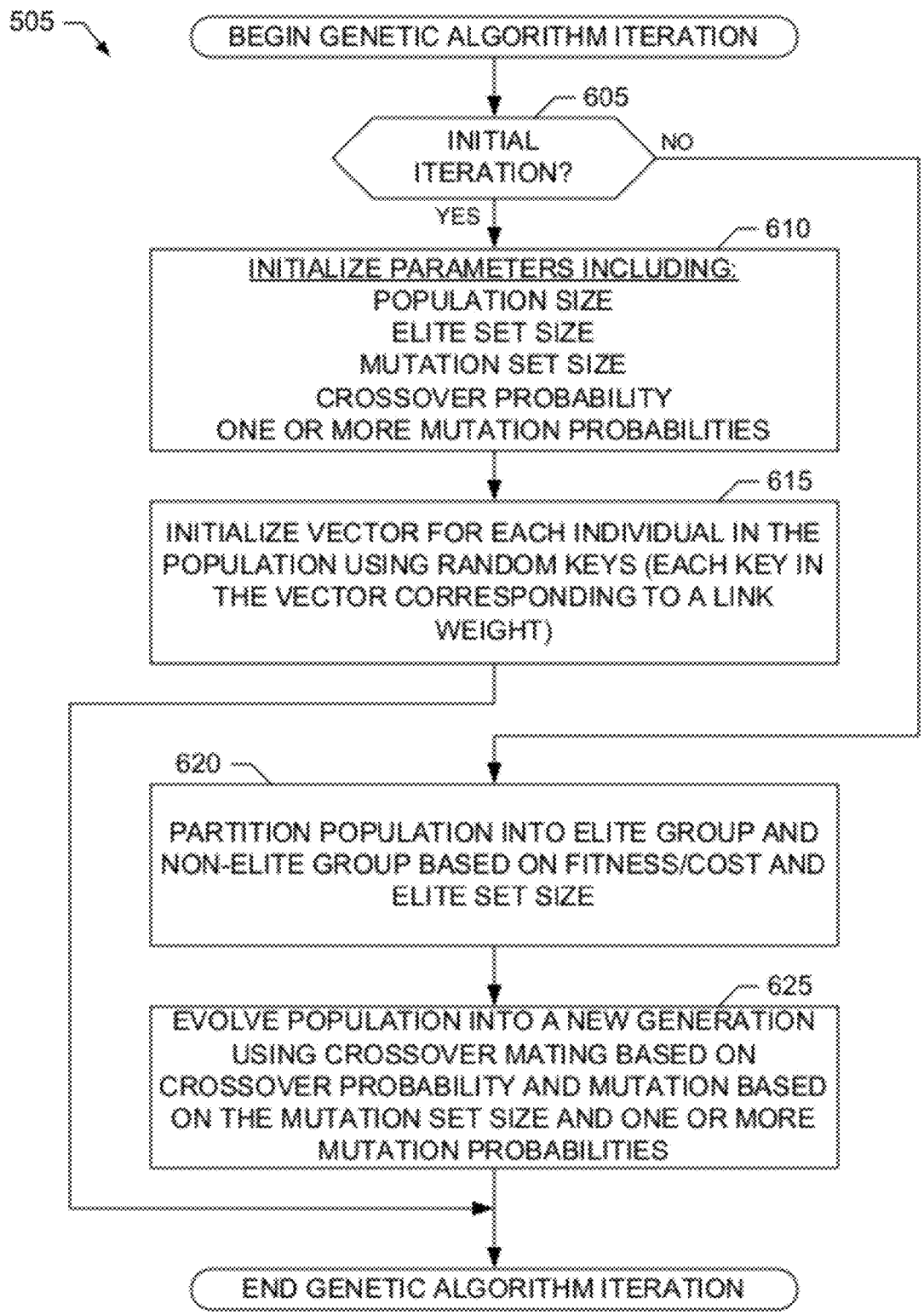
FIG. 6 is a flowchart representative of example machine readable instructions that may be executed to implement genetic algorithm processing in the link weight solver of FIG. 4.

Example machine readable instructions 500 that may be executed to implement the link weight solver 400 of FIG. 4 to determine a set of link weights for performing routing (e.g., DEFT or OSPF routing) in a communication network are represented by the flowchart shown in FIG. 5. With reference to the preceding figures and associated descriptions, the machine readable instructions 500 begin execution at block 505 of FIG. 5 at which the genetic algorithm processor 405 included in the link weight solver 400 performs an iteration of a biased random key genetic algorithm to update (e.g., evolve) a population of vectors each containing a set of keys decodable into a corresponding set of possible link weights for the links of a communication network. Example machine readable instructions that may be used to implement the processing at block 505 are illustrated in FIG. 6 and described in greater detail below.

Figure 7:
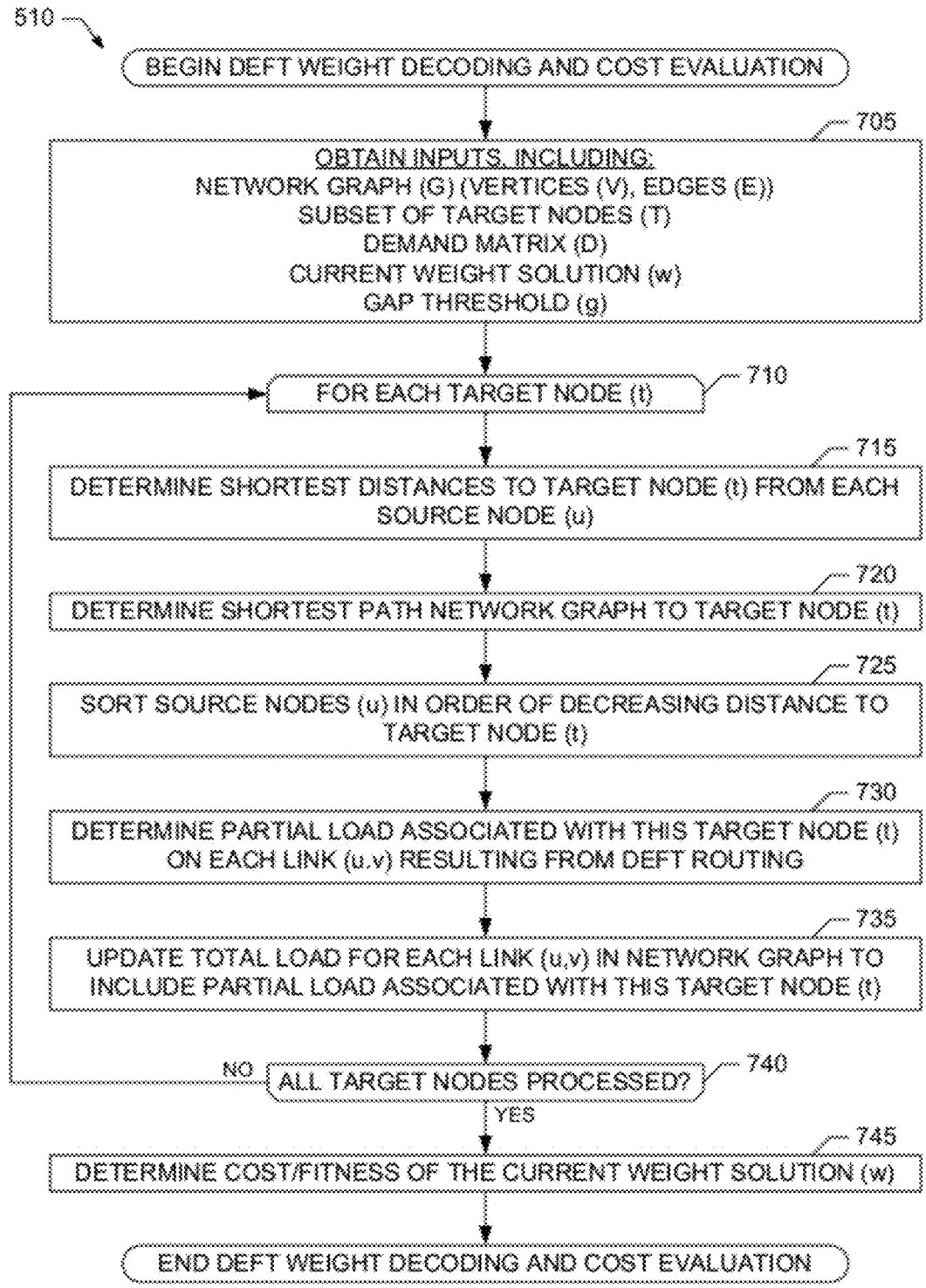
FIG. 7 is a flowchart representative of example machine readable instructions that may be executed to implement weight decoding in the link weight solver of FIG. 4.

At block 510, the weight decoder 410 included in the link weight solver 400 decodes each set of keys included in each updated (e.g., evolved) vector of the population into respective sets of possible link weights (such as DEFT weights or OSPF weights). Additionally, at block 510 the weight decoder 410 determines the routing cost (or fitness) of Equation 1 for each decoded set of possible link weights. Example machine readable instructions that may be used to implement the processing at block 510 are illustrated in FIGS. 7-8 and described in greater detail below.

Figure 9:
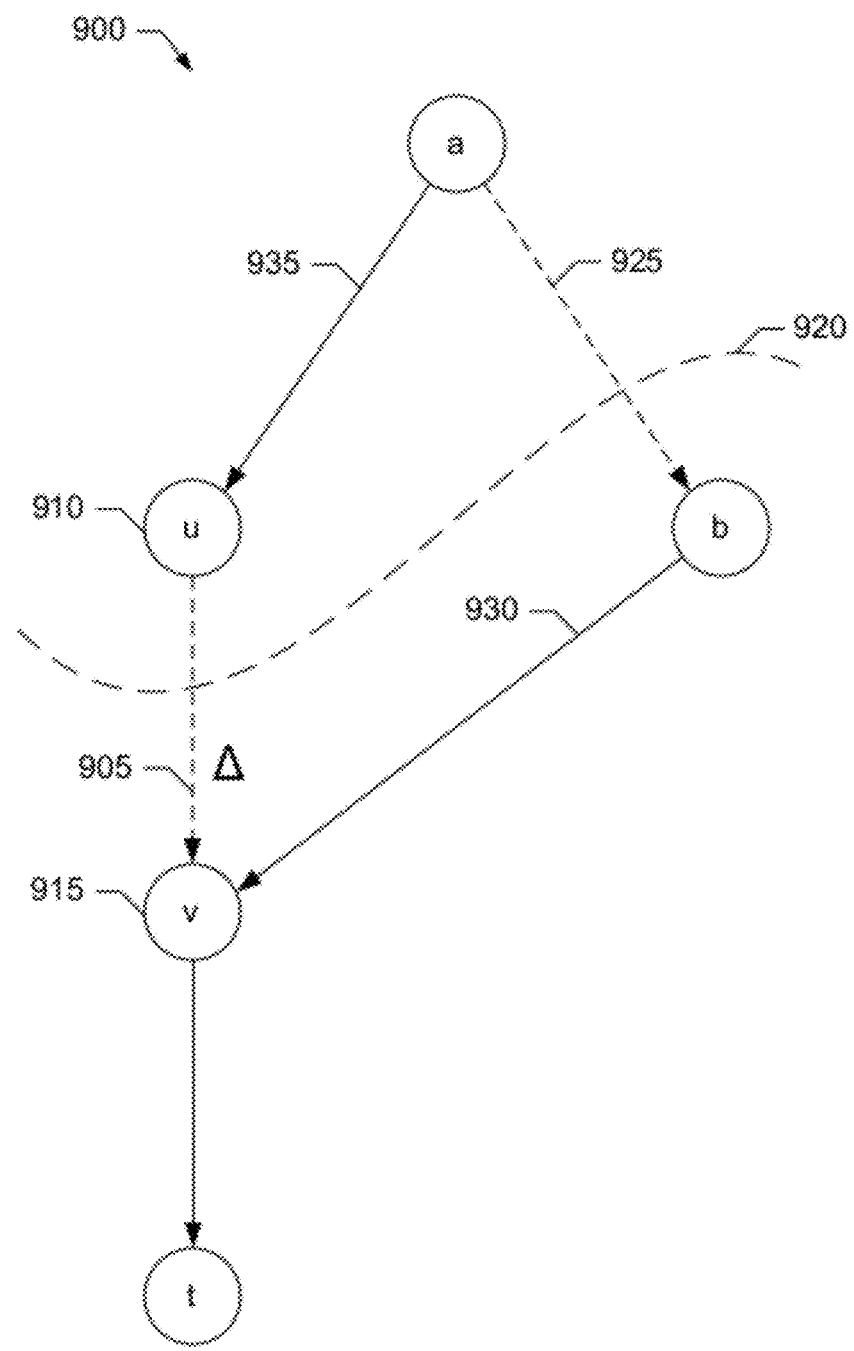
FIG. 9 illustrates an example effect on routing flow of incrementing a link weight in a set of possible link weights determined by the link weight solver of FIG. 4.
Figure 10:
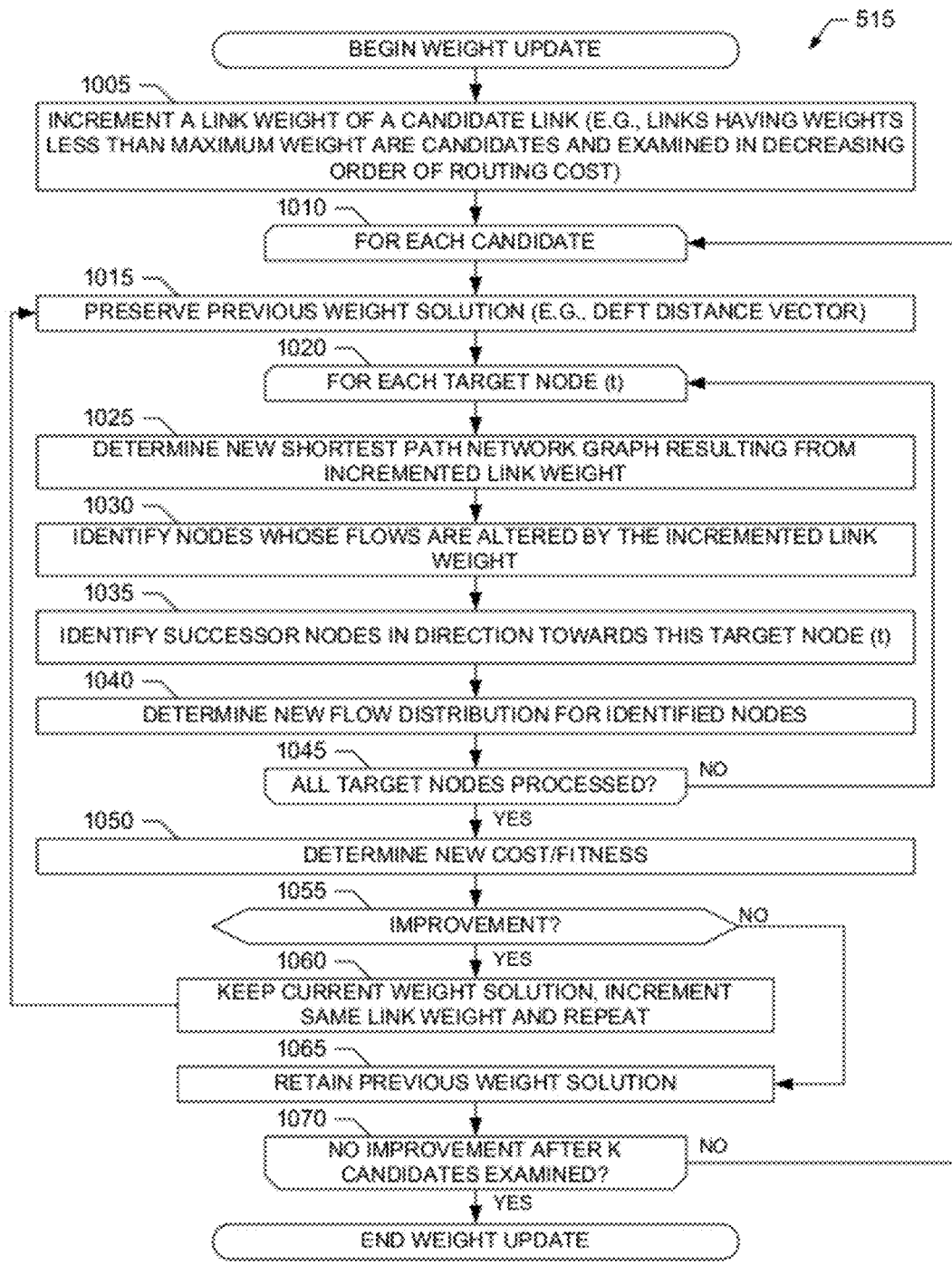
FIG. 10 is a flowchart representative of example machine readable instructions that may be executed to implement weight updating in the link weight solver of FIG. 4.

At block 515, the weight updater 415 included in the link weight solver 400 performs a local search to modify (e.g., repeatedly increment) values of one or more weights in each set of possible link weights decoded at block 510 to attempt to improve the cost (or fitness) associated with each set of possible link weights. For example, in the case of DEFT weights being decoded at block 510, the weight updater 415 may implement a dynamic flow update algorithm to determine the new routing cost resulting from modifying (e.g., incrementing) a weights at block 515. Example machine readable instructions that may be used to implement the processing at block 515 are illustrated in FIGS. 9-11 and described in greater detail below.

At block 520, the link weight solver 400 determines whether the iterative processing performed at blocks 505-515 has converged to a solution for the set of link weights. For example, the link weight solver 400 may determine that processing has converged when the minimum routing cost (or best fitness) among the set of possible link weights determined via processing at blocks 505-515 remains unchanged after one or more successive iterations. If processing has not converged (block 520), processing returns to block 505 to begin another iteration. However, if processing has converged, then at block 520 the link weight solver 400 selects the set of link weights having the lowest routing cost (or best fitness) to be the solution for weight setting problem and, thus, the set of link weights for performing routing (e.g., DEFT or OSPF routing) in the communication network. Execution of the example machine readable instructions 500 then ends.

Example machine readable instructions 505 that may be executed to implement the genetic algorithm processor 405 of FIG. 4 and/or perform the genetic algorithm processing at block 505 of FIG. 5 are illustrated in FIG. 6. Genetic algorithms, such as one or more of the example genetic algorithm implemented by the genetic algorithm processor 405 and/or represented by the machine readable instructions 505 of FIG. 6, mimic survival of the fittest to find good quality (e.g., optimal or near-optimal) solutions to combinatorial optimization problems. Using generally-accepted terminology for describing genetic algorithms, solutions are associated with individuals in a population. Each individual's chromosome encodes the solution. Each chromosome is made up of strings of genes, each of which takes on a value, called an allele, from some alphabet. The fitness of a chromosome is correlated with the objective function value of the solution encoded by the chromosome. Over a number of generations (e.g., iterations of the genetic algorithm), individuals that make up a population are evolved. At each generation (e.g., iteration), offspring of the current population are produced to make up the population of the next generation. Mutation takes place in genetic algorithms as a means to escape entrapment in local minima. Individuals are selected at random for mating. The probability that an individual is selected is proportional to the fitness of that individual. This way, the genetic material from the most fit individuals is passed on to the next generation (corresponding to survival of the fittest evolution).

Examples of genetic algorithms that can be implemented by the genetic algorithm processor 405 and/or the machine readable instructions 505 of FIG. 6 are the random key genetic algorithm (RKGA) and the biased RKGA (BRKGA). In RKGA and BRKGA, chromosomes are represented as a vector of random real numbers (also referred to as random keys) in the interval [0,1]. A decoder, such as the weight decoder 415, takes as input any vector of random keys and associates with it a solution of the combinatorial optimization problem (e.g., such as the weight setting problem) for which an objective value or fitness can be computed (e.g., such as the routing cost of Equation 1).

The initial population in an RKGA or BRKGA is made up of P vectors of random keys, where P can be a configuration parameter. Each key for each vector in the initial population is generated at random in the real interval [0,1]. After decoding each individual, the population is partitioned into two groups of individuals: a smaller group of $p_e$ elite individuals containing those individuals with the best fitness values, and a larger group with the remaining P-$p_e$ non-elite individuals, where $p_e$<P-$p_e$. To evolve the population, a new generation of individuals is produced. RKGA and BRKGA use an elitist strategy to evolve the population from one generation to the next. In such a strategy, all of the elite individuals of generation k are copied unchanged to generation k+1. RKGAs and BRKGAs implement mutation by introducing mutants into the population. A mutant is simply a vector of random keys generated in the same way that an element of the initial population is generated. At each generation a small set of $p_m$ mutants is introduced into the population. Discounting the $p_e$ elite individuals and the $p_m$ mutants, P-$p_e$-$p_m$ additional individuals need to be produced to complete the P individuals that make up the population of the next generation. These offspring are produced through mating.

For example, after all individuals are sorted by their fitness values, the population is partitioned into a set of elite solutions, containing the most fit (e.g., lowest routing cost) solutions, and another of the remaining non-elite solutions. The $p_e$ elite random-key vectors are copied without change to the next population. The $p_m$ mutant individuals are randomly generated and placed in the new population. The remainder of the population of the next generation is completed by crossover. In a RKGA, two parents for mating are selected at random from the entire population. In a BRKGA, each offspring is generated by mating one parent chosen at random (with repetition) from the elite partition in the current population and the other parent is chosen at random (also with repetition) from the non-elite partition. This way, an individual can produce more than one offspring in the same generation. Mating in both RKGA and BRKGA is performed with parameterized uniform crossover. For example, let $p_e$>0.5 denote the probability that an offspring inherits the key of its elite parent and let n denote the number of keys in a random-key vector. Then, for i=1, . . . , n, the i-th allele c(i) of the offspring c takes on the value of the i-th allele e(i) of the elite parent e with probability $\rho_e$ and the value of the i-th allele $\bar{e}(i)$ of the non-elite parent $\bar{e}$ with probability $1-\rho_e$. In this way, an offspring is more likely to inherit characteristics of the elite parent than those of the non-elite parent (corresponding to survival of the fittest evolution). Because any random key vector can be decoded into a solution, the offspring resulting from mating is always valid and, thus, can be decoded into a solution of the combinatorial optimization (e.g., weight setting problem).

Based on the foregoing description of RKGAs and BRK-GAs, execution of the machine readable instructions 505 of FIG. 6 to implement the genetic algorithm processor 405 of FIG. 4 and/or perform the genetic algorithm processing at block 505 of FIG. 5 begins at block 605 at which the genetic algorithm processor 405 determines whether an initial iteration of the genetic algorithm is being performed. If an initial iteration is being performed (block 605), then at block 610 the genetic algorithm processor 405 initializes the configuration parameters of the genetic algorithms. Examples of parameters initialized at block 610 include, but are not limited to, the population size (P), the elite set size ($p_e$), the mutation set size ($p_m$), the mating crossover probability ($\rho_e$), one or more mutation probabilities (described in greater detail below), etc. At block 615, the genetic algorithm processor 405 initializes, as described above, the vector for each individual of the population to have a set of random keys, where each key is decodable into a respective possible link weight, as also described above.

However, if an initial iteration is not being performed (block 605), then a new generation of the population is to be determined and, thus, at block 620 the genetic algorithm processor 405 partitions, as described above, the population of vectors into an elite group and a non-elite group based on the population and elite set sizes configured at block 610, and the fitness (e.g., routing cost) associated with each vector in the population. At block 625, the genetic algorithm processor 405 evolves (e.g., updates) the population of vectors into a new generation using crossover mating and mutation, as described above, based on the crossover probability, mutation set size and one or more mutation probabilities configured at block 610. Execution of the genetic algorithm iteration performed by the example machine readable instructions 505 of FIG. 6 then ends.

In an example implementation, a BRKGA implemented by the genetic algorithm processor 405 and/or the example machine readable instructions 505 is configured as follows. The population is partitioned such that the set of elite solutions is made up of the 25% most fit individuals (e.g., $p_e=0.25p$). The number of mutants created at each new generation corresponds to 5% of the new population (e.g., $p_m=0.05p$). Additionally, another form of mutation is performed in which, for each gene, with a mutation probability of 1% (or any other probability value), each allele (e.g., each key) of the child inherits, in the crossover operator, a new random key in the interval (0,1). Furthermore, if the child does not inherit the new random key, then the probability that a child inherits the corresponding allele (e.g., key) of the elite parent is 70% (e.g., $\rho_e=0.7$).

Example machine readable instructions 510 that may be executed to implement the weight decoder 410 of FIG. 4 and/or perform weight decoding and routing cost determination at block 510 of FIG. 5 are illustrated in FIGS. 7 and 8. The example machine readable instructions 510 correspond to weight decoding implementation to determine DEFT weights for DEFT routing in a communication network. To provide context for the descriptions of FIGS. 7 and 8, an example implementation of the weight decoder 410 to perform OSPF weight decoding is first described.

Given a vector of keys determined by the genetic algorithm processor 405 using the BRKGA described above in connection with FIG. 6, the weight decoder 410 produces a network flow for which the congestion is computed with the network congestion function of Equation 1. In the BRKGA, an individual of the population is encoded as a vector x of n=|E| random keys, where each random key $x_i \in (0,1)$, for $i=1, \ldots, n$. Given a particular individual vector x, a respective initial OSPF weight vector can be decoded by the weight decoder 410 to have individual link weights of $w_i = \lceil x_i \times w_{max} \rceil$, where $w_{max}=20$ (or any other appropriate value). In such an example, initial OSPF link weights are integers in the interval [1,20]. Starting from an initial OSPF weight vector, the weight updater 415 performs a fast local search to try to decrease network congestion by simple changes in individual link weights.

An example local search procedure examines the effect of increasing the weights of a subset of the links (e.g., arcs). The candidate links are links whose weight is smaller than $w_{max}$, and the candidates are visited in decreasing order of their routing cost $\Phi(f_{u,v}, c_{u,v})$. To reduce the routing cost of a candidate link, the procedure attempts to increase its weight (within a given range) to reduce its load. If this leads to a reduction of the overall routing cost, the change is accepted, and the procedure is restarted. Otherwise, the increase is rejected and the procedure continues with the next candidate link.

The local search is repeated until k candidate arcs have their weights increased without improving the solution. In some example, the weight updater 415 is configured with k=5 (or some other relatively small value) to keep the search neighborhood small and, thus, help preserve the diversity of the population.

To develop an implementation of the weight decoder 410 for DEFT weights, recall that, in OSPF routing, the flow on each node is evenly split among all shortest path links leaving this node with destination t. In DEFT, the load in a node u is split among all outgoing links (u, v) (and not only on links on the shortest path) in the direction of t, i.e. when $d_u^t > d_v^t$. Moreover, the load is not split equally among all links as in OSPF. Instead, DEFT applies an exponential penalty to longer paths between origin-destination pairs such that more load is routed through links that result in shorter paths.

Also, in contrast to integer OSPF weights, the DEFT weights are positive real numbers. Therefore, an implementation of DEFT on current routing hardware has to decide how to map the real DEFT weights onto an available range of integer weights, typically a 16-bit integer. Another issue with DEFT is how to handle small flow fractions. Even a path that is considerably longer than the shortest path to the target will receive a flow. This flow, however, can be very small, because the assigned fraction of flow decreases exponentially. As such, distributing flows to much longer paths can increase communication latency.

To solve these problems, some example implementations of the weight decoder 410 described herein work with integer weights, but use a scaling parameter p. Real-valued DEFT distances are obtained by dividing the integer distances by p. This integer-based DEFT implementation is referred to herein as int-DEFT when appropriate to avoid ambiguity. In the experiments described below, a scaling parameter of p=1.8 is used, although any other scaling parameter could alternatively be used.

To avoid routing on long paths with a marginal flow contribution, some examples of the weight decoder 410 employ a maximum gap g, and route flow only on links whose integer gap $h_{u,v}^t$ is at most g. In the experiments describe below, the maximum gap is set to g=9, which excludes from routing those paths which would receive a fraction of the flow having less than $e^{-10/1.8} \approx 0.39\%$ of the flow routed on a shortest path. In such examples employing a maximum gap, the non-normalized flow fraction Γ in the direction to target node t traversing link (u, v) as defined in Equation 5 is modified to become Equation 6:

$$\Gamma(h_{u,v}^t) = \begin{cases} e^{-h_{u,v}^t/p} & \text{if } d_u^t > d_v^t \text{ and } h_{u,v}^t \le g \\ 0 & \text{otherwise.} \end{cases} \quad \text{Equation 6}$$

With the foregoing description of an example implementation of the weight decoder 410 to support DEFT as a reference, the example machine readable instructions 510 are now described. FIG. 7 illustrates the example machine readable instructions 510 in the form of a flowchart, whereas FIG. 8 illustrates the example machine readable instructions 510 in the form of pseudocode. Execution of the example machine readable instructions 510 executed to implement the weight decoder 410 of FIG. 4 and/or perform weight decoding and routing cost determination at block 510 of FIG. 5 begins at block 705 of FIG. 7 at which the weight decoder 410 obtains inputs for decoding a population of vectors determined using, for example, the BRKGA procedure described above into sets of possible DEFT weights. For example, the parameters obtained at block 705 can include, but are not limited to, graph G describing the topology of the routers V and links E forming the communication network, the target nodes T of the network, the demand matrix D specifying the load (or demand) to be conveyed from source nodes to the target nodes in the network, a current possible weight solution corresponding to a current set of possible DEFT weights w determined from one of the updated population vectors resulting from the current iteration of the BRKGA procedure, the gap threshold g, etc. In some examples, each current set of DEFT link weights w is determined from a respective population vector in a manner similar to the OSPF implementation described above in which individual link weights are determined by scaling each key (e.g., each individual vector element) of each population vector by a scale factor or, in other words, $w_i = \lceil x_i \times w_{max} \rceil$.

Next, for each destination node t∈T, the weight decoder 410 computes the reverse shortest path distance (blocks 710 and 715 of FIG. 7, and lines 802 and 802 of FIG. 8) and, with a scan of the links/arcs, the shortest path graph G^t (block 720 of FIG. 7, and line 803 of FIG. 8). Next, the weight decoder 410 performs a procedure (e.g., ComputePartialLoads illustrated in lines 804-822 of FIG. 8) that implements DEFT rules that allow flows to be routed on non-shortest paths. For example, the weight decoder 410 sorts the nodes in decreasing order of their distances to t (block 725 of FIG. 7 and line 805 of FIG. 8). Then, at block 730, the weight decoder 410 analyzes nodes one by one, in decreasing distance to the target node, and determines the partial load flow associated with the target node on each link resulting from employing DEFT routing. For example, block 730 of FIG. 7 can include the loop in lines 808-813 of FIG. 8 at which the weight decoder 410 calculates the sum ($\Gamma_{total}$) of the flow distribution function of Equation 6 for each outgoing link of the current node. In FIG. 8, OUT(u)={v: (u, v)∈E} denotes the set of outgoing links of node u. Block 730 of FIG. 7 can also include line 814 of FIG. 8, at which the weight decoder 410 calculates the total demand f (traversing and leaving the current node) per unit of Γ. Block 730 of FIG. 7 can further include the loop in lines 815-821, at which the weight decoder 410 calculates, for each forward outgoing link of node u, the flow traversing the link according to its proportion of Γ. At block 735 of FIG. 7 (corresponding to line 824 of FIG. 8), the weight decoder 410 updates the total load of each link/arc with the partial loads calculated for destination nodes t∈T. Finally, at block 745 of FIG. 7 (corresponding to line 826 of FIG. 8), the weight decoder 410 computes the fitness value of the solution (e.g., using Equation 1).

Example machine readable instructions 515 that may be executed to implement the weight updater 415 of FIG. 4 and/or perform the local search processing for weight updating at block 515 of FIG. 5 are illustrated in FIGS. 10 and 11. The example implementations of FIGS. 10 and 11 are developed as follows. As noted above, the DEFT routing protocol distributes the flow among shortest and non-shortest paths to a target node. As a result, small changes can cause a new flow distribution in the network, even when the shortest path graph is unaltered. As a consequence, a change in a link weight can lead to an altered flow in a potentially large number of links. To reduce the computational cost of evaluations of the objective function of Equation 1 by the local search procedure, a dynamic flow update algorithm is employed for the int-DEFT implementations described herein. An example dynamic flow update algorithm receives a unitary increment of a single link weight and updates only the part of the network affected by this change.

It turns out that there are three main cases to be analyzed. Let t be the target node. Given a unitary increment Δ in the weight of link (u, v), nodes can be classified in three different cases according to their distance change. First, nodes with no outgoing load (leaving or traversing the node) directed to t are not affected by the increment Δ. Second, nodes belonging to paths forwarding to t, in the case that before and after the change all forwarding paths traverse arc (u, v), and whose distances have changed, have no modifications in their loads because the loads traversing these nodes are affected equally by any Δ variation of the link weight. As such, the flow distribution is unaltered. In the third case are those nodes that, with increment Δ, create alternative paths that do not traverse arc (u, v). Those, and each intermediate successor node towards the target node t, have their flow distribution altered and, therefore, have to be reevaluated.

Consider, as an example, the network graph 900 illustrated in FIG. 9. Suppose that due to the increment Δ in link (u, v) (labeled as 905 in FIG. 9), node u (labeled as 910) and node v (labeled as 915), which are above the dashed curve 920, are the nodes whose distances are affected. Suppose that, before the increment, link (a, b) (labeled as 925) did not belong to the shortest path, but after the increment it does. In this case, which corresponds to the third case described in the preceding paragraph, some load is sent through link (a, b) (labeled as 925) and link (b, v) (labeled as 930), while link (a, u) (labeled as 935) and link (u, v) (labeled as 905) have their loads decreased.

With the foregoing description of the three main cases to be examined by an example dynamic flow update algorithm implemented by the weight updater 415 as a reference, the example machine readable instructions 515 are now described. FIG. 10 illustrates the example machine readable instructions 515 in the form of a flowchart, whereas FIG. 11 illustrates the example machine readable instructions 515 in the form or pseudocode. The example machine readable instructions 515 begin implementing weight updating at block 1005 of FIG. 10 at which the weight updater 415 increments the weight of a candidate link of a set of possible link weights (e.g., where the set of possible link weights is a possible link weight solution corresponding to one of the population vectors updated by the genetic algorithm). The increment is represented by Δ, which can be an integer equal to or greater than 1. As in the case of the local search procedure described above for OSPF, candidate links for a possible link weight solution are links having weights less than a maximum weight, and candidate links are examined in decreasing order of routing cost.

For each candidate (block 1010 of FIG. 10), the weight updater 415 preserves the previous set of possible link weights corresponding to this possible weight solution (block 1015 of FIG. 10 and line 1101 of FIG. 11). (A set of possible link weights is also referred to as a distance vector because paths distances are determined by summing the link weights along the paths.) Then, for each target node t∈T (block 1020 of FIG. 10 and line 1102 of FIG. 11), the weight updater 415 calculates the new reverse shortest path graph G$^t$ for this target node t resulting from incrementing the candidate link weight (block 1025 of FIG. 10 and lines 1103-1104 of FIG. 11). Next, at block 1030 of FIG. 10 (corresponding to the loop at lines 1106-1113 of FIG. 11) the weight updater 415 identifies all nodes u with two or more forward outgoing arcs having at least one successor whose shortest distance to t is not altered (corresponding to condition2 in FIG. 11) and a different successor whose shortest distance to t is increased by exactly Δ (corresponding to condition1 in FIG. 11). Those nodes represent the third case described above, and their flows are to be altered due to incrementing the candidate link weight.

In some examples, the nodes that are identified at block 1035 of FIG. 10 (corresponding to the loop at lines 1106-1113 of FIG. 11) as having altered flows are stored in a heap data structure $H_{d, d_{old}}$, whose keys are pairs of the current and the previous shortest distance (before the Δ increase) to t. The heap is ordered by the current distance and, in case of a tie, by the previous distance. More formally, this heap ordering is represented by Equation 7:

$$(d, d_{old}) < (d', d'_{old}) \text{ if } d < d' \text{ or } (d = d' \text{ and } d_{old} < d'_{old}). \quad \text{Equation 7}$$

From Equation 7, if two nodes have the same distance, the node with the smaller distance before the update ($d_{old}$) has to be processed first, to avoid evaluating links whose flow was not yet updated. With the order established by Equation 7, the flow on links is reset (e.g., see line 1133 of FIG. 11) before being calculated, to not consider the old flows on those links.

Next, at block 1035 of FIG. 10 (corresponding to the loop in lines 1114-1118 of FIG. 11) the weight updater 415 adds to the heap each intermediate node that is a successor in the direction of t of a node whose flow has been altered (e.g., as identified at block 1035 of FIG. 10 or lines 1106-1113 of FIG. 11). The weight updater 415 then calculates the new flow distribution associated with these identified nodes (block 1040 of FIG. 10 and lines 1119-1137 of FIG. 11). For example, at line 1127 of FIG. 11, the weight updater 415 calculates the total flow leaving each of the identified nodes. At lines 1128-1135 of FIG. 11, the weight updater 415 determines how to split the flow proportionally among all outgoing arcs. At lines 1138, the weight updater 415 calculates the sum of all flow fractions over all target nodes.

After all target nodes of t are processed, the weight updater 415 evaluates the total network congestion Φ (given by Equation 1) for the current set of possible link weights for which one of the link weights was incremented (block 1050 of FIG. 10 and line 1140 of FIG. 11). The weight updater 415 determines whether an improvement in the total network congestion Φ was achieved by incrementing the link weight (block 1055 of FIG. 10). If an improved was achieved (block 1055 of FIG. 10), the current version of the set of possible link weights having the incremented link weight is retained and the process is repeated (block 1060). However, if an improvement was not achieved (block 1055 of FIG. 10), the weight updater 415 retains the previous version of the set of possible weights (block 1060 of FIG. 10). The weight updater 415 then continues examining the effect of incrementing other candidate link weights in the current set of possible link weights until no improvement is observed after examining a specified/configured number of candidate link weights.

Example performance results for OSPF and DEFT link weight setting using the example BRKGA methods, apparatus and articles of manufacture described herein are illustrated in FIGS. 12-20H. The performance of BRKGA for OSPF and DEFT link weight setting as described herein was examined on twelve synthetic networks and another instance with real data from a large tier-1 Internet service provider (ISP). Table 1 summarizes the characteristics of these networks. The columns represent, respectively, the instance class, the instance name, number of nodes, number of arcs/links, the values of link capacities (the instance att has a large amount of different values for the link capacities, so this entry is omitted from the table), and the number of origin-destination (O-D) demand pairs. The instances are classified into four groups: historical data from the ISP Backbone (att), two-level hierarchical networks (hier), random networks (rand), and Waxman networks (wax).

TABLE 1

| Instance | Name | Nodes | Links | Capacities | O-D pairs |
|---|---|---|---|---|---|
| ISP backbone | att | 90 | 274 | — | 272 |
| Two-level hierarchy | hier50a | 50 | 148 | 200 and 1000 | 2450 |
| | hier50b | 50 | 212 | 200 and 1000 | 2450 |
| | hier100 | 100 | 279 | 200 and 1000 | 9900 |
| | hier100a | 100 | 360 | 200 and 1000 | 9900 |
| Random topology | rand50 | 50 | 228 | 1000 | 2450 |
| | rand50a | 50 | 245 | 1000 | 2450 |
| | rand100 | 100 | 403 | 1000 | 9900 |
| | rand100b | 100 | 503 | 1000 | 9900 |
| Waxman | wax50 | 50 | 169 | 1000 | 2450 |
| | wax50a | 50 | 230 | 1000 | 2450 |
| | wax100 | 100 | 391 | 1000 | 9900 |
| | wax100a | 100 | 476 | 1000 | 9900 |

Seven different demand matrices were examined for each network, obtained by scaling a basic demand matrix for each instance by a factor from 6 to 12. The BRKGA was tested with the following parameters:

Population size: P=50 individuals;
Weight interval: [1, $w_{max}$]=[1,20];
Algorithm running time: 60 minutes;
Probability of inheriting allele from elite parent during crossover: $\rho_e$=0.7;
Maximum gap for $h_{u,v}^t$: g=9; and
Scaling parameter: p=1.8.

The experiments were carried out on a cluster of ten (10) Intel Duo Core processors with 1.23 GHz, 1.0 GB RAM, and running Linux 2.6.18-4. Each run used a single processor.

A first experiment explored the time savings obtained by tuning the BRKGA and weight decoding procedures to work efficiently for DEFT and by using the dynamic flow algorithm described above in connection with FIGS. 9-11 as compared to a straightforward adaptation of the BRKGA discussed above for OSPF. In particular, the following three different implementations were compared:

(1) int-DEFT-DSSSP: A straightforward adaptation to DEFT of the BRKGA proposed for OSPF. This implementation employed a dynamic single source shortest path (DSSSP) algorithm. The routing followed DEFT rules and was computed statically.

(2) int-DEFT-opt: int-DEFT-DSSSP, with its data structures tuned to work efficiently with DEFT, thereby decreasing the running times. In particular, the data structure that maintains the number of links leaving each node that belongs to a shortest path to the destination node (in OSPF) is unnecessary in DEFT.

(3) int-DEFT: int-DEFT-opt, but additionally using the dynamic flow algorithm described above.

Figure 12:
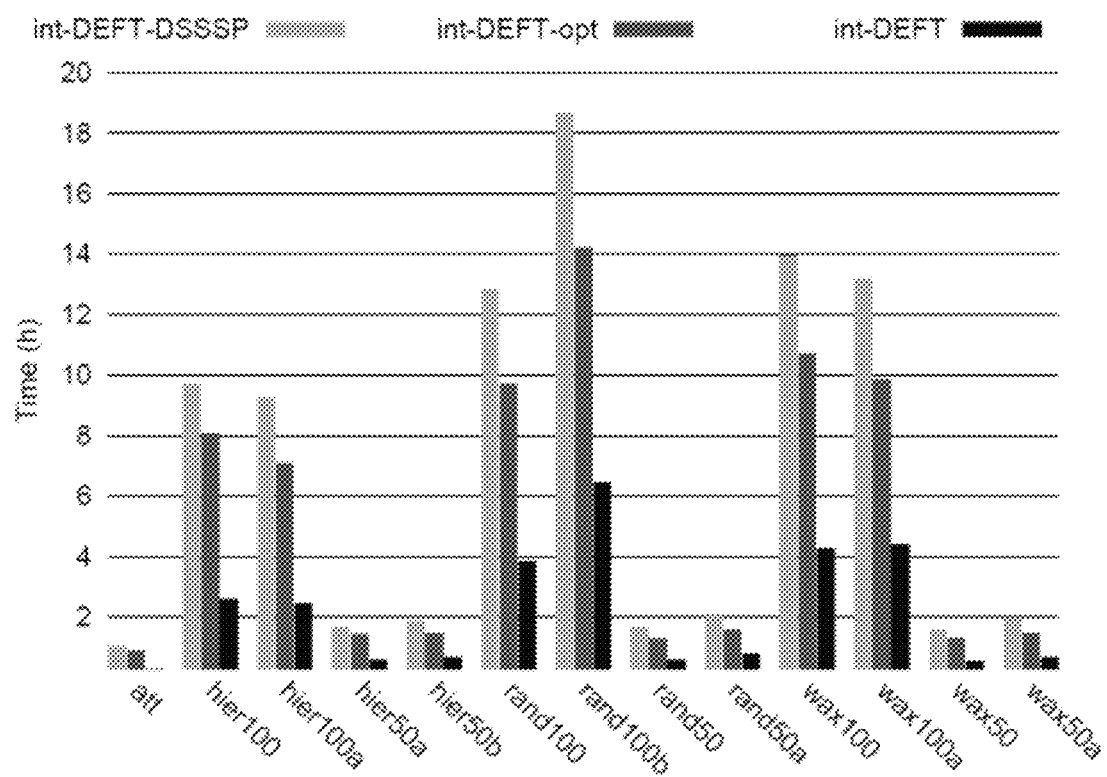
Figure 13C:
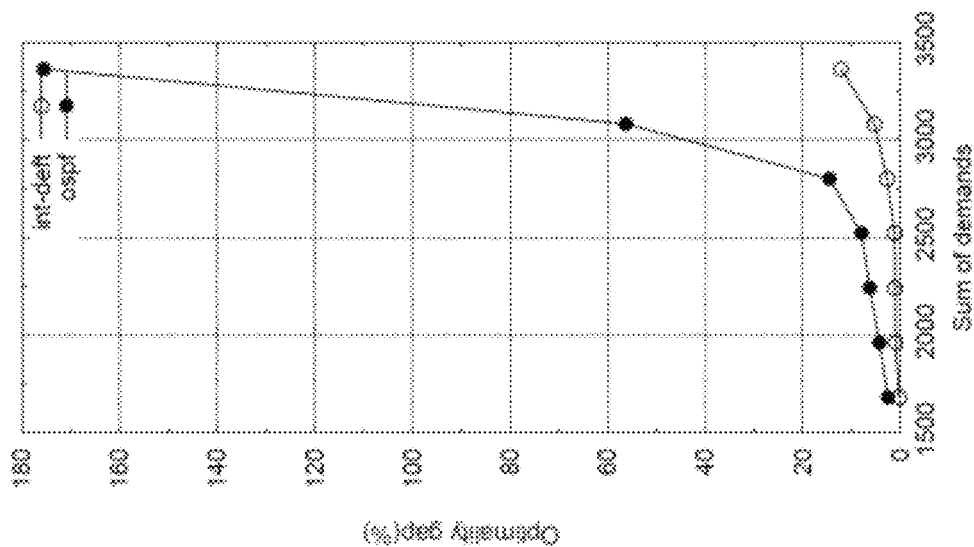
Figure 13B:
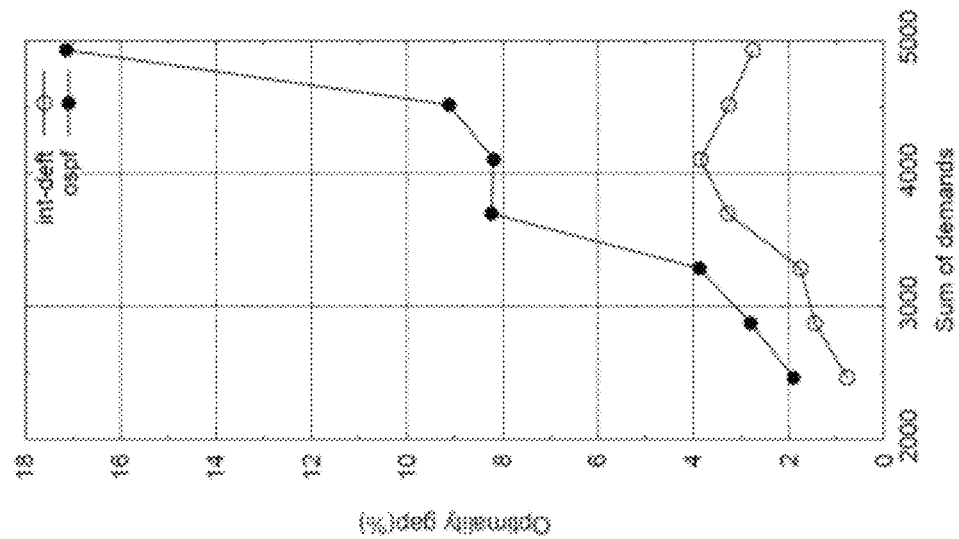
Figure 13A:
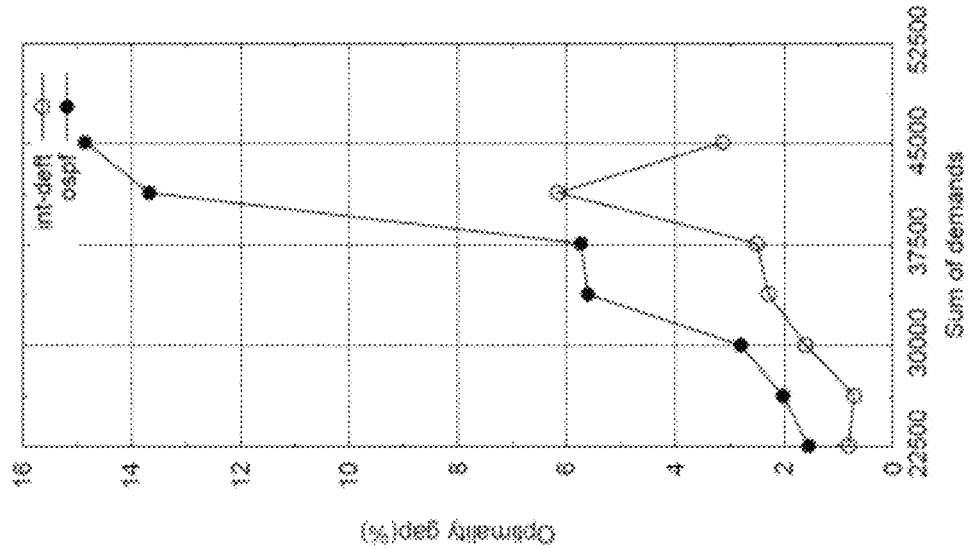

It should be noted that the link weight solution determined by each of these three implementations is the same, independent of the implementation. However, the running times are affected by which implementation is used. FIG. 12 shows a comparison of the execution time in hours for 1000 generations of the three implementations and Table 2 shows the speedups of the improved implementations over int-DEFT-DSSSP. All 13 network instances of Table 1 were tested with the highest total demand.

TABLE 2

| Implementation | Instance | | | | | | |
| --- | --- | --- | --- | --- | --- | --- | --- |
| | att | hier100 | hier100a | hier50a | hier50b | rand100 | rand100b |
| int-DEFT-opt | 1.18 | 1.20 | 1.31 | 1.19 | 1.27 | 1.32 | 1.31 |
| int-DEFT | 3.74 | 3.73 | 3.77 | 2.89 | 2.71 | 3.33 | 2.89 |
| | rand50 | rand50a | wax100 | wax100a | wax50 | wax50a | |
| int-DEFT-opt | 1.29 | 1.32 | 1.30 | 1.34 | 1.22 | 1.30 | |
| int-DEFT | 2.81 | 2.68 | 3.25 | 3.01 | 2.86 | 2.82 | |

Table 2 shows that the straightforward adaptation from OSPF is on average 3.12 times slower than the int-DEFT version. From the data in Table 2, it can also be seen that the performance gains are mainly due to the dynamic flow computation. Tuning the implementation for DEFT results in only an average speedup of 1.27, while the dynamic flow computation algorithm was responsible for 51% to 68% of the time savings for the set of instances tested. Thus, it can be concluded that even for non-shortest path routing protocols like DEFT it is worthwhile to implement dynamic flow computation as described above in connection with FIGS. 9-11.

Figure 14C:
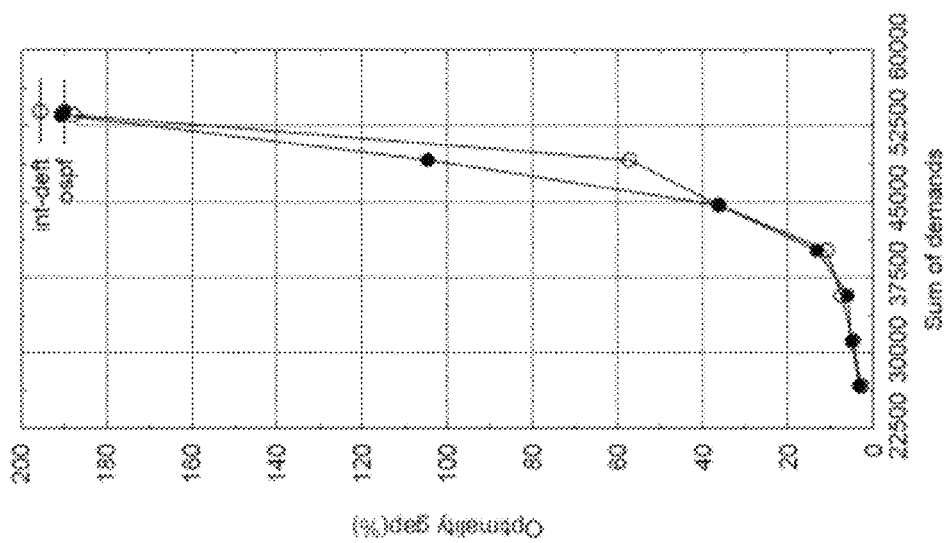
Figure 14B:
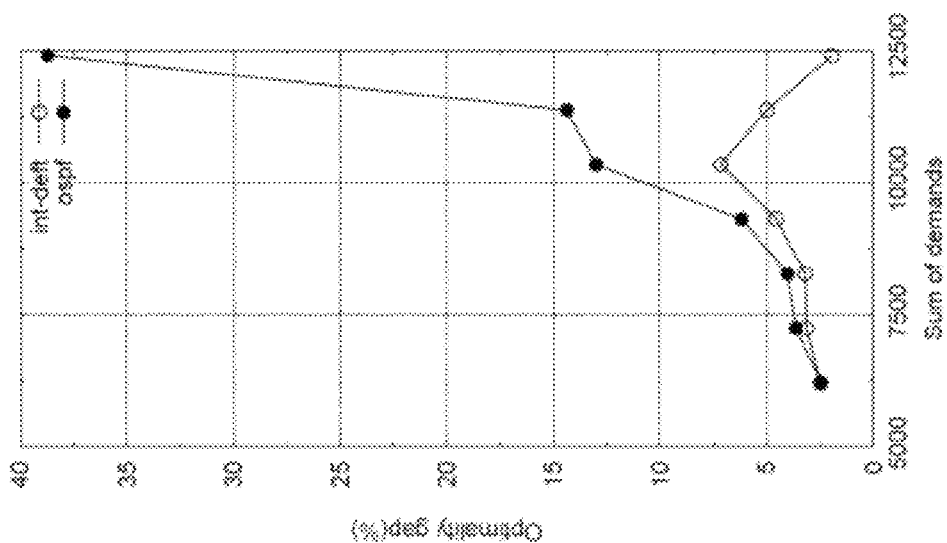
Figure 14A:
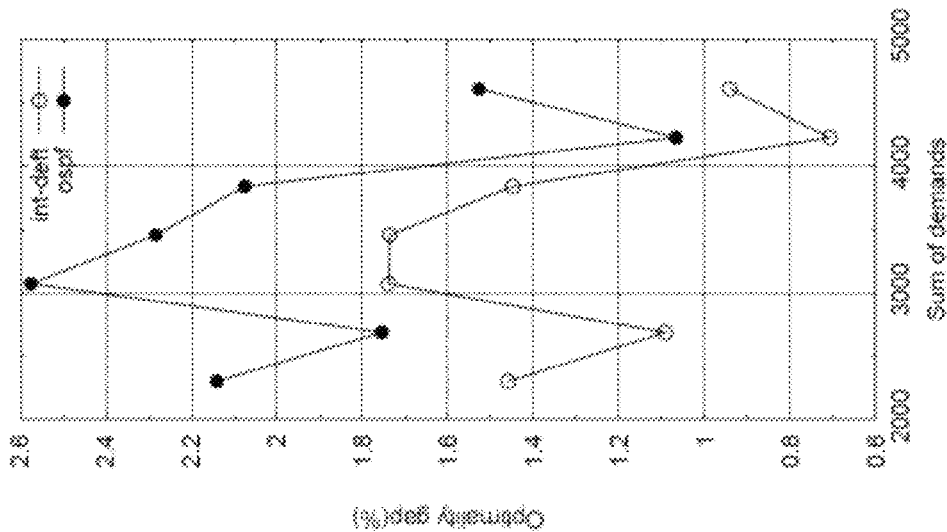
Figure 15C:
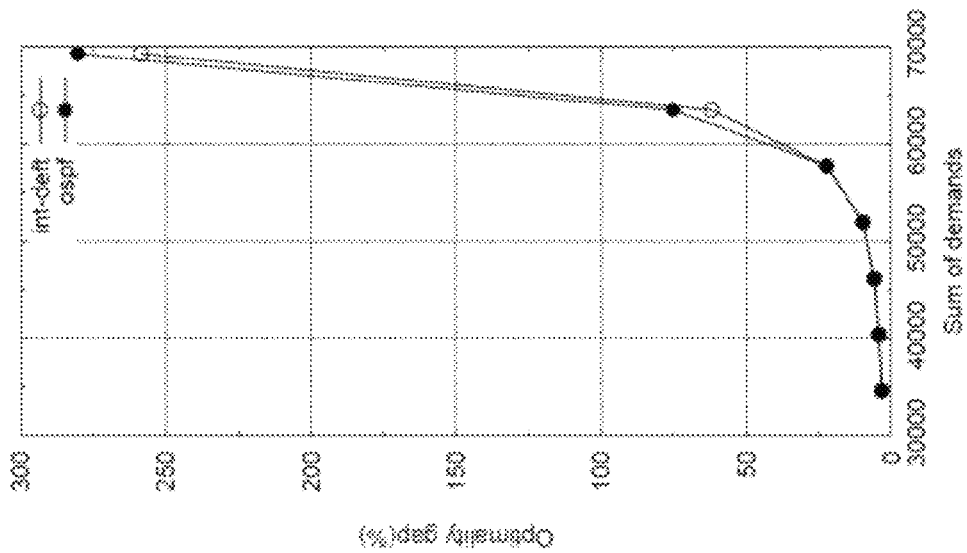
Figure 15B:
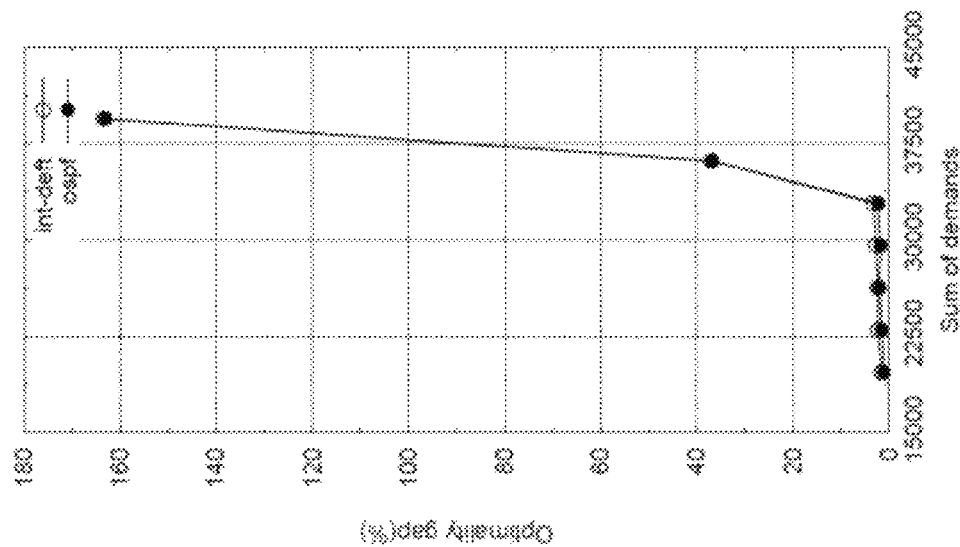
Figure 15A:
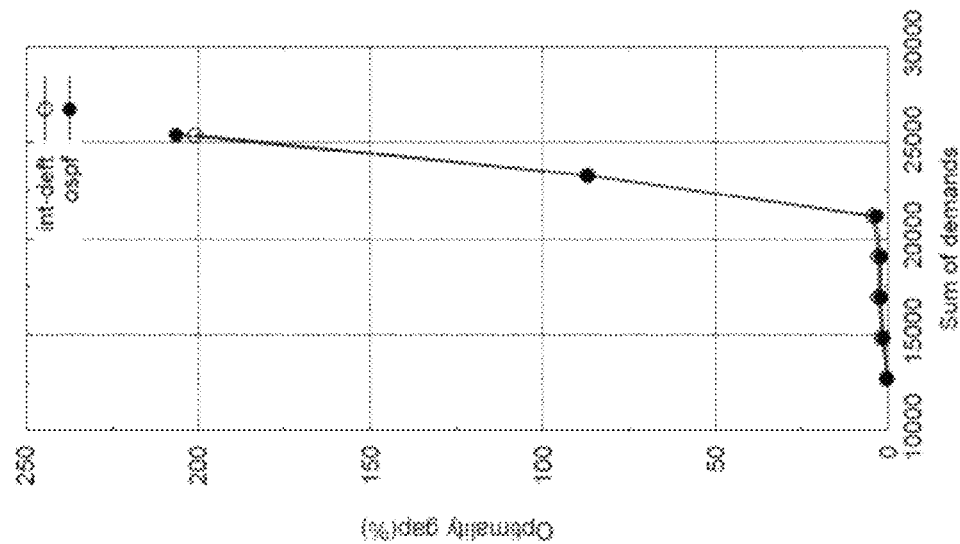
Figure 16B:
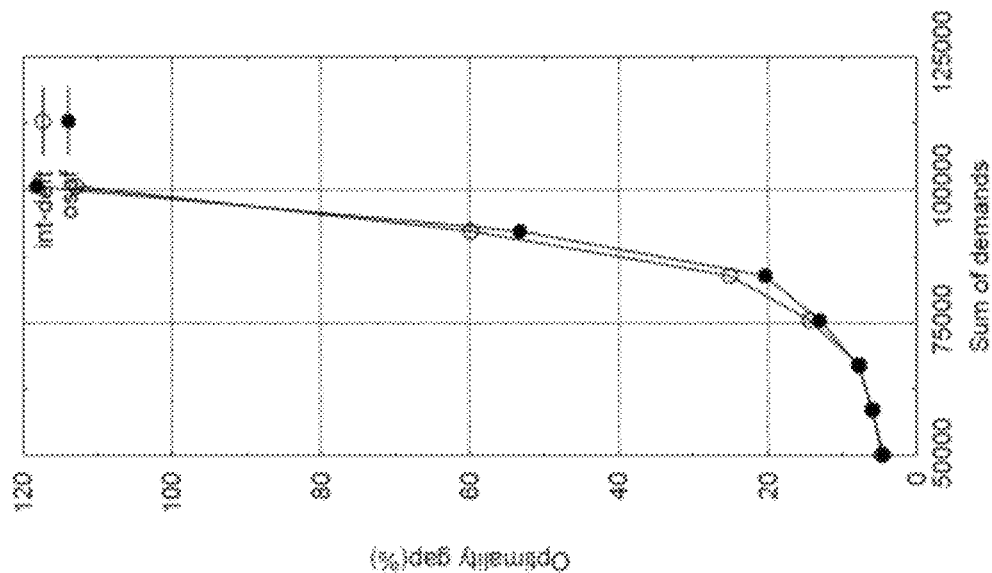
Figure 16A:
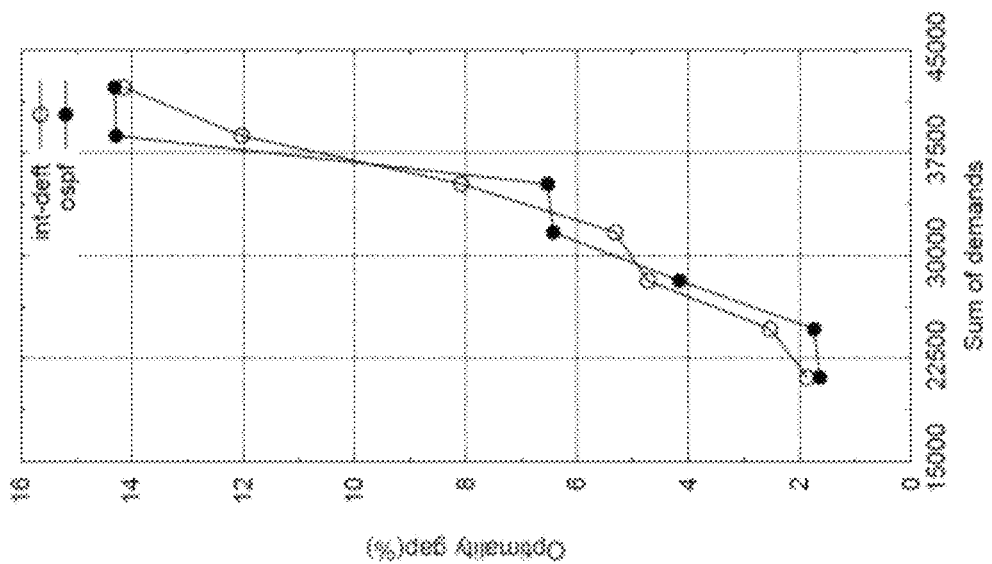
Figure 17A:
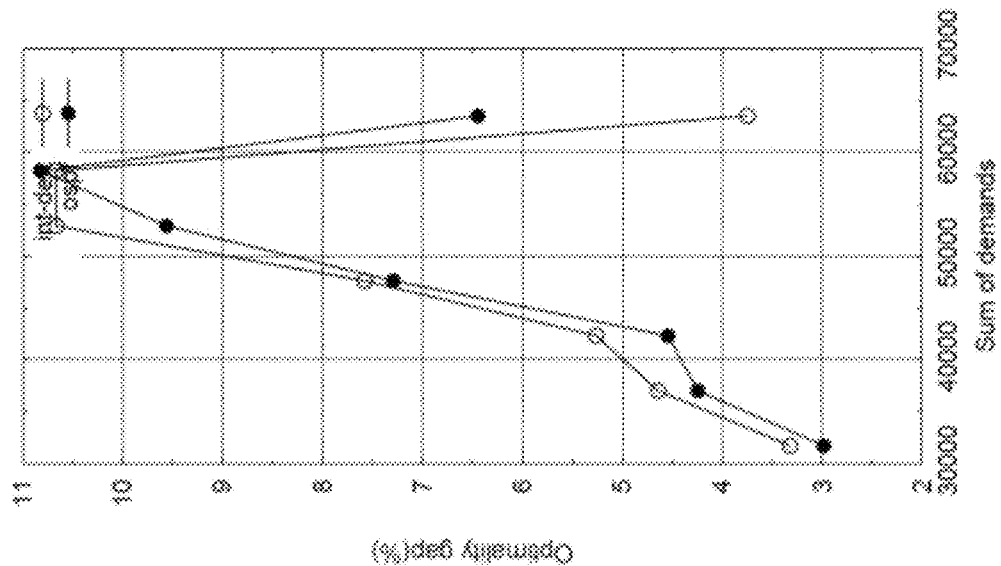
Figure 17B:
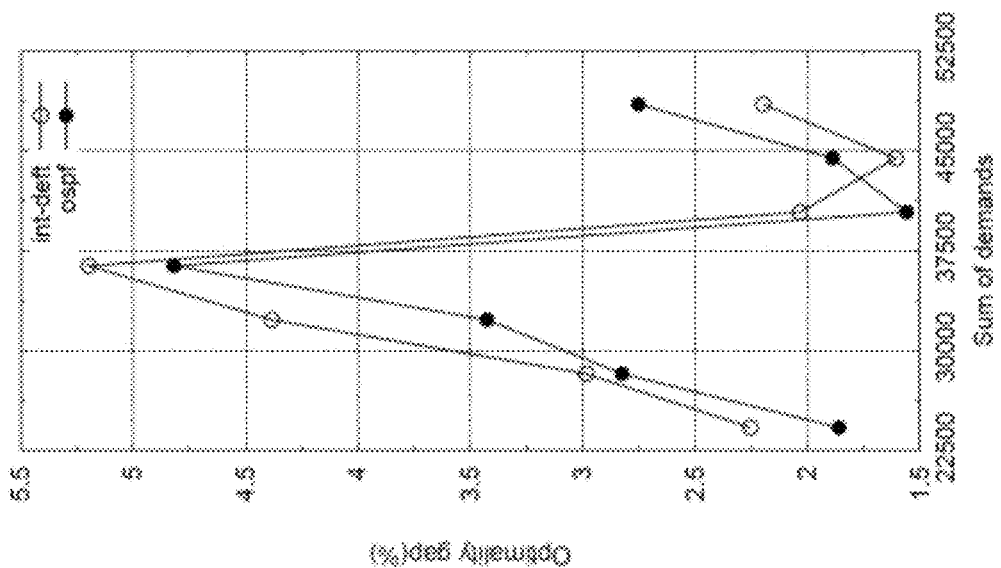
Figures 18A, 18B, 18C, 18D:
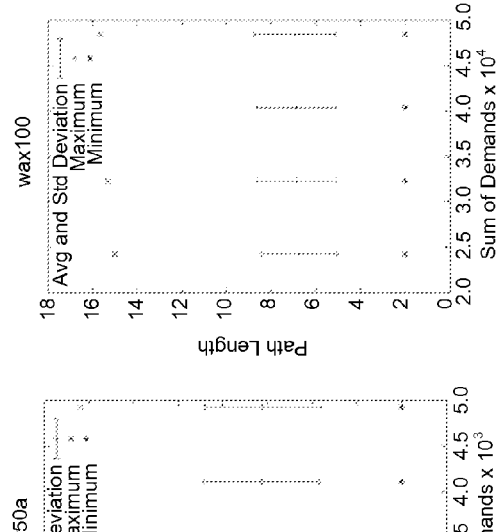
Figures 18E, 18F, 18G, 18H:
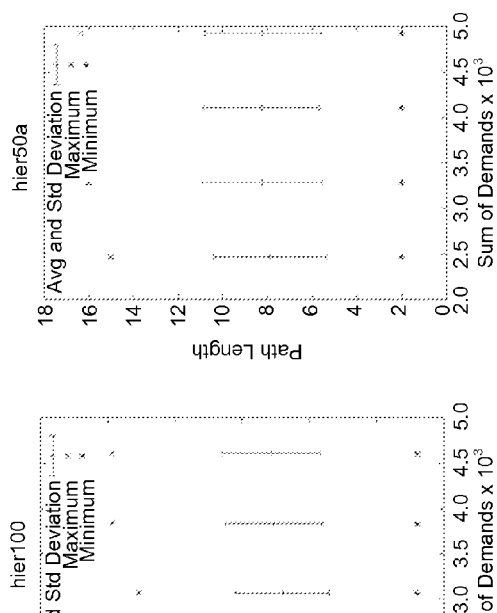

A second set of experiments compared the quality of the solutions obtained by the BRKGA when routing with OSPF and DEFT. Performance was quantified in terms of an optimality gap, which is the additional routing cost of the best link weight solution determined by the BRKGA techniques described herein, as a percentage of the routing cost of the lower bound given by the solution of OPT. FIGS. 13-17 show the results for DEFT and OSPF for the network instances listed in Table 1. In particular, FIGS. 13A, B and C illustrate the BRKGA optimality gap for the network instances att, hier50a, and hier50b of Table 1, respectively, with each figures depicting the optimality gaps measured for OSPF and DEFT solutions. FIGS. 14A, B and C illustrate the BRKGA optimality gap for the network instances hier100, hier100 and rand50a of Table 1, respectively, with each figures depicting the optimality gaps measured for OSPF and DEFT solutions. FIGS. 15A, B and C illustrate the BRKGA optimality gap for the network instances wax50, wax50a and rand100 of Table 1, respectively, with each figures depicting the optimality gaps measured for OSPF and DEFT solutions. FIGS. 16A and B illustrate the BRKGA optimality gap for the network instances rand50 and rand100b of Table 1, respectively, with each figures depicting the optimality gaps measured for OSPF and DEFT solutions. FIGS. 17A and B illustrate the BRKGA optimality gap for the network instances wax100 and wax100a of Table 1, respectively, with each figures depicting the optimality gaps measured for OSPF and DEFT solutions.

For the six instances in FIGS. 13A-C and 14A-C, DEFT is able to improve over OSPF. In particular, for high total demands, where OSPF has large optimality gaps, DEFT can lower the gaps considerably. For the seven instances shown in FIGS. 15A-C, 16A-B and 17A-B, both DEFT and OSPF result in about the same optimality gap, with the five instances in FIGS. 15C, 16A-B and 17A-B, having points where DEFT yields slightly worse results than OSPF.

A third experiment analyzed the number of intermediate nodes involved in the routes of a demand path. For an examined demand matrix, the following three metrics were compared:

(1) Path length, which is the average path length over all paths used for routing for all O-D demand pairs, measured in number of nodes of the path;

(2) Number of paths, which is the average number of different paths used for routing the O-D demand pairs. Two paths are considered different if one path has at least one link/arc that does not belong to the other path; and (3) Percentage of intermediate nodes affected, which represents the average number of intermediate nodes routing an O-D demand pair, as a percentage of the total number of nodes.

For each network instance examined, the minimum, maximum, and average values, as well as the standard deviation, of these three metrics were determined, considering all paths of all O-D demand pairs. The values are the average of three runs of 1000 generations each. To conduct this experiment, the following four network instances of Table 1 were examined: att, hier100, hier50a, and wax100. For each network instance, four demand matrices were considered. These results for each of these metrics are presented in turn.

The path length experiment has the objective of comparing the network delay for int-DEFT and OSPF measured as the length of the paths (i.e., the number of nodes that comprise the paths). The shortest path, the longest path, and the average path size among all paths of all O-D demand pairs were determined. The measure was calculated for int-DEFT and OSPF for the best solution of the 1000th population generation of the BRKGA, for four demand matrices of the four instances att, hier100, hier50a, and wax100 used in the experiments. FIGS. 18A-H present the results for int-DEFT and OSPF.

From the plots in FIGS. 18A-H, it can be observed that the path lengths for int-DEFT are about 40% longer than in OSPF. For example, for the demand matrix with the largest sum of demands, the average path lengths found by int-DEFT are 10.63, 12.80, 8.2, and 6.92 hops, whereas the corresponding values for OSPF are 7.94, 9.03, 6.01, and 4.47 hops. If we compare the path length with the shortest possible length as given by the topology of the instances, OSPF adds on average 2 hops, compared to 4.8 hops in int-DEFT. In a telecommunication network, it can be desirable to maintain the path lengths as short as possible. One reason is that as the path length increases, so does the expected number of demand pairs affected by a failure. Thus, the length of a path can be directly related to the quality of service of a telecommunication network.

With respect to the minimum path length observed, they are the same for OSPF and int-DEFT. The minimum value is four for instance att, and two for the other three instances. That was expected, since both protocols route through the shortest path, and a path of length two indicates that the path is composed of a single direct link. Instance att does not have O-D demand pairs between all pairs of nodes, while the other instances do. Thus, it is possible to have the minimum value larger for att than for the other instances.

From an analysis of results of FIGS. 18A-H, two other conclusions can be drawn. For example, the path length is almost constant through the generations for all four instances tested. Additionally, as can be seen in the plots, the path lengths vary only slightly with the total demand.

The number of paths experiment measures the minimum, maximum, and average number of paths among all paths of all O-D demand pairs. The measure is calculated for int-DEFT and OSPF for the best solution of the 1000th population generation of the BRKGA, for four demand matrices of four instances. Two paths are considered different if one has at least one link/arc that the other does not have, and a path is considered different from a set of paths if it is different from each path of the set. FIGS. 19A-H present the number of paths metrics for the solution found for int-DEFT and OSPF.

From FIGS. 19A-H, the average number of paths found by int-DEFT is about 10 times higher than the average number found in OSPF solutions. For example, considering the demand matrix with the largest total demand, the average values for int-DEFT are 10.13, 12.67, 5.08, and 9.23, whereas the corresponding values for OSPF are 1.63, 1.77, 1.36, and 1.08. The difference between the number of paths between int-DEFT and OSPF could be even larger if a larger gap threshold for $h_{u,v}^t$ is used. A gap threshold equal to nine (9) was used in the experiments to avoid having a very small amount of load for a demand pair flowing in a link.

From FIGS. 19A-H, one can observe that the number of paths changes slightly with the total demand. Further experiments also showed that the number of paths is about the same over different generations of the BRKGA.

The percentage of intermediate nodes affected experiment has the objective of showing the distribution of paths in the network. In other words, this experiment presents the percentage of nodes that are part of some path used in an O-D demand pair. The smallest, largest, and average percentage of intermediate nodes among all paths of all O-D demand pairs were measured. The measure is calculated for int-DEFT and OSPF for the best solution of the 1000th population generation of the BRKGA, for four demand matrices of the four instances used in the experiments. FIGS. 20A-H depict the number of intermediates nodes for int-DEFT and OSPF.

In the experiments performed, the percentage of intermediate nodes of int-DEFT is almost twice the percentage of intermediate nodes of OSPF. Since int-DEFT sends flows among all forward links, it is expected that a larger part of the graph would be used for routing a demand pair. As for the path length, the larger the set of intermediate nodes, the higher the probability of a demand pair being affected in the case of a link or node failure. For example, considering the demand matrix with the largest total demand, the average percentages of intermediate nodes used in the int-DEFT solution are 13.98, 12.23, 18.93, and 12.61, whereas the corresponding values for the OSPF solution are 8.61, 8.37, 11.83, and 4.57.

As shown in FIGS. 20A-H, the minimum percentage of intermediate nodes is about the same for int-DEFT and OSPF. The maximum percentage for DEFT was about twice the maximum percentage found by OSPF in most instances, and for the instance wax100, the percentage of intermediate nodes in int-DEFT was three times the percentage of OSPF.

It was also observed that the percentage of intermediate nodes was about the same throughout the generations of the BRKGA. Additionally, as can be observed in FIGS. 20A-H, the values did not change much when different demand matrices were considered.

Figure 21:
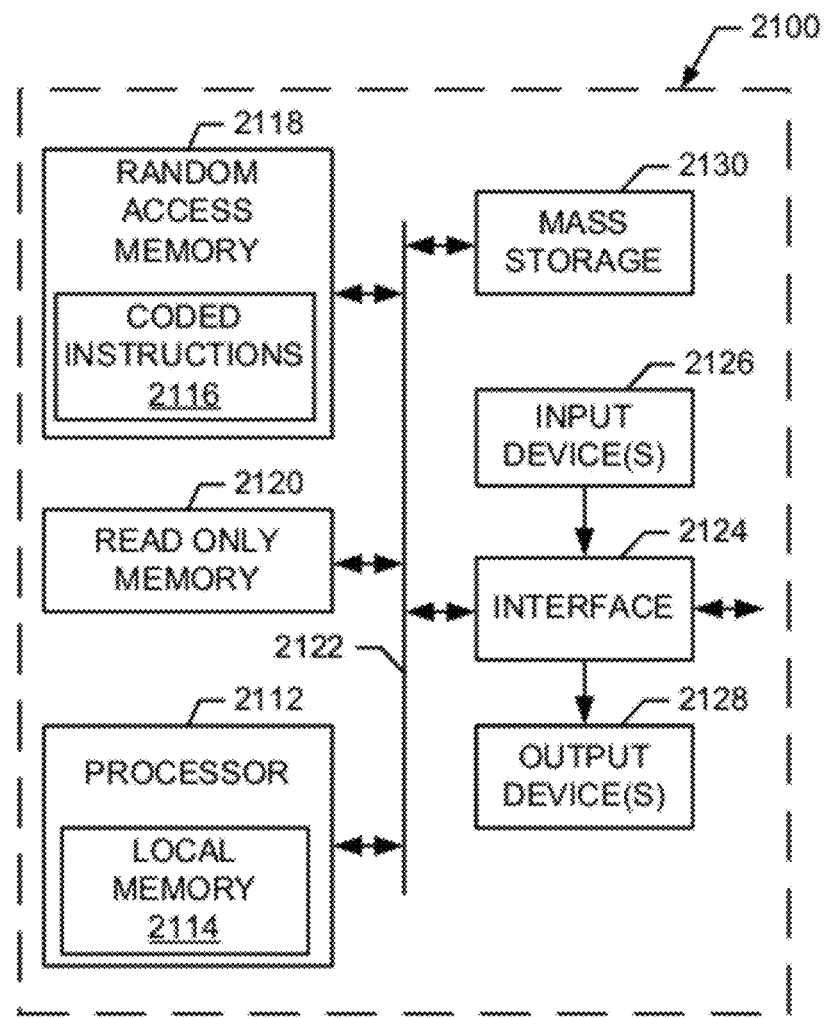
FIG. 21 is a block diagram of an example processing system that may execute the example machine readable instructions of FIGS. 5-8, 10 and/or 11 to implement the link weight solver of FIG. 4.

FIG. 21 is a block diagram of an example processing system 2100 capable of implementing the apparatus and methods disclosed herein. The processing system 2100 can be, for example, a server, a personal computer, a personal digital assistant (PDA), an Internet appliance, a DVD player, a CD player, a digital video recorder, a personal video recorder, a set top box, or any other type of computing device.

The system 2100 of the instant example includes a processor 2112 such as a general purpose programmable processor. The processor 2112 includes a local memory 2114, and executes coded instructions 2116 present in the local memory 2114 and/or in another memory device. The processor 2112 may execute, among other things, the machine readable instructions represented in FIGS. 5-8 and 10-11. The processor 2112 may be any type of processing unit, such as one or more Intel® microprocessors from the Pentium® family, the Itanium® family and/or the XScale® family, one or more microcontrollers from the ARM® and/or PIC® families of microcontrollers, etc. Of course, other processors from other families are also appropriate.

The processor 2112 is in communication with a main memory including a volatile memory 2118 and a non-volatile memory 2120 via a bus 2122. The volatile memory 2118 may be implemented by Static Random Access Memory (SRAM), Synchronous Dynamic Random Access Memory (SDRAM), Dynamic Random Access Memory (DRAM), RAMBUS Dynamic Random Access Memory (RDRAM) and/or any other type of random access memory device. The non-volatile memory 2120 may be implemented by flash memory and/or any other desired type of memory device. Access to the main memory 2118, 2120 is typically controlled by a memory controller (not shown).

The processing system 2100 also includes an interface circuit 2124. The interface circuit 2124 may be implemented by any type of interface standard, such as an Ethernet interface, a universal serial bus (USB), and/or a third generation input/output (3GIO) interface.

One or more input devices 2126 are connected to the interface circuit 2124. The input device(s) 2126 permit a user to enter data and commands into the processor 2112. The input device(s) can be implemented by, for example, a keyboard, a mouse, a touchscreen, a track-pad, a trackball, an isopoint and/or a voice recognition system. The interface circuit 2124 and one or more of the input devices 2126 can be used to implement the input interface 420 of FIG. 4.

One or more output devices 2128 are also connected to the interface circuit 2124. The output devices 2128 can be implemented, for example, by display devices (e.g., a liquid crystal display, a cathode ray tube display (CRT)), by a printer and/or by speakers. The interface circuit 2124, thus, typically includes a graphics driver card. The interface circuit 2124 and one or more of the output devices 2128 can be used to implement the output interface 425 of FIG. 4.

The interface circuit 2124 also includes a communication device such as a modem or network interface card to facilitate exchange of data with external computers via a network (e.g., an Ethernet connection, a digital subscriber line (DSL), a telephone line, coaxial cable, a cellular telephone system, etc.).

The processing system 2100 also includes one or more mass storage devices 2130 for storing software and data. Examples of such mass storage devices 2130 include floppy disk drives, hard drive disks, compact disk drives and digital versatile disk (DVD) drives. The mass storage device 2130 may implement the storage 430 of FIG. 4. Additionally or alternatively, the volatile memory 2118 may implement the storage 430 of FIG. 4.

At least some of the above described example methods and/or apparatus are implemented by one or more software and/or firmware programs running on a computer processor. However, dedicated hardware implementations including, but not limited to, application specific integrated circuits, programmable logic arrays and other hardware devices can likewise be constructed to implement some or all of the example methods and/or apparatus described herein, either in whole or in part. Furthermore, alternative software implementations including, but not limited to, distributed processing or component/object distributed processing, parallel processing, or virtual machine processing can also be constructed to implement the example methods and/or apparatus described herein.

To the extent the above specification describes example components and functions with reference to particular standards and protocols, it is understood that the scope of this patent is not limited to such standards and protocols. For instance, each of the standards for Internet and other packet switched network transmission (e.g., Transmission Control Protocol (TCP)/Internet Protocol (IP), User Datagram Protocol (UDP)/IP, HyperText Markup Language (HTML), HyperText Transfer Protocol (HTTP)) represent examples of the current state of the art. Such standards are periodically superseded by faster or more efficient equivalents having the same general functionality. Accordingly, replacement standards and protocols having the same functions are equivalents which are contemplated by this patent and are intended to be included within the scope of the accompanying claims.

Additionally, although this patent discloses example systems including software or firmware executed on hardware, it should be noted that such systems are merely illustrative and should not be considered as limiting. For example, it is contemplated that any or all of these hardware and software components could be embodied exclusively in hardware, exclusively in software, exclusively in firmware or in some combination of hardware, firmware and/or software. Accordingly, while the above specification described example systems, methods and articles of manufacture, persons of ordinary skill in the art will readily appreciate that the examples are not the only way to implement such systems, methods and articles of manufacture. Therefore, although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A method to determine link weights in a communication network, the method comprising:
   iteratively updating a plurality of vectors using a genetic algorithm, the vectors including a plurality of individual values decodable into possible link weights; and
   decoding a first one of the vectors updated using the genetic algorithm into a first plurality of link weights providing communication network, the load to be split among a plurality of paths having respective path lengths determined from the first plurality of link weights, at least two of the paths having different path lengths, wherein iteratively updating the plurality of vectors further comprises:
   partitioning the plurality of vectors into a first group of vectors and a second group of vectors based on routing costs associated with the vectors; and
   randomly combining a first subset of the first group of vectors and a second subset of the second group of vectors based on a crossover probability.

2. The method as defined in claim 1 wherein iteratively updating the plurality of vectors further comprises:
   randomly generating a third group of vectors for inclusion in the plurality of vectors; and
   randomly setting a first individual value of a second vector formed by combining one of the first group of vectors and one of the second group of vectors based on a mutation probability.

3. The method as defined in claim 1 further comprising including the first group of vectors in the plurality of vectors updated using the genetic algorithm.

4. The method as defined in claim 1 wherein, after an iteration of the genetic algorithm, the method further comprises:
   decoding the plurality of vectors updated using the genetic algorithm into respective pluralities of link weights supporting dynamic exponentially-weighted flow splitting;
   determining respective dynamic exponentially-weighted flow splitting routing costs for the respective pluralities of link weights; and
   when a processing convergence is detected, selecting a first plurality of link weights from the pluralities of link weights, the first plurality of link weights associated with a minimum dynamic exponentially-weighted flow splitting routing cost to perform dynamic exponentially-weighted flow splitting routing in the communication network.

5. The method as defined in claim 4 wherein, after decoding the plurality of vectors updated using the genetic algorithm into the respective pluralities of link weights, the method further comprises:
   incrementing a first link weight of a first plurality of link weights from the pluralities of link weights, the first plurality of link weights decoded from the first one of the vectors updated using the genetic algorithm;
   determining whether incrementing the first link weight improved a first dynamic exponentially-weighted flow splitting routing cost associated with the first plurality of link weights;
   if the first dynamic exponentially-weighted flow splitting routing cost is improved, again incrementing the first link weight and determining whether the first dynamic exponentially-weighted flow splitting routing cost is improved; and if the first dynamic exponentially-weighted flow splitting routing cost is not improved, iteratively incrementing a next link weight of the first plurality of link weights and determining whether an associated dynamic exponentially-weighted flow splitting routing cost is improved until no improvement is observed after examining a number of link weights of the first plurality of link weights.

6. The method as defined in claim 1 wherein the at least two paths comprise one or more links, and the load is not to be split onto a link having a gap distance exceeding a gap threshold, the gap distance determined from the first plurality of link weights.

7. The method as defined in claim 1 wherein decoding the first one of the vectors into the first plurality of link weights comprises:
scaling individual values included in the first one of the vectors by a scale factor; and
rounding the scaled individual values to respective nearest integer values to determine respective link weights.

8. A tangible machine readable medium comprising machine readable instructions which, when executed, cause a machine to perform operations comprising:
iteratively updating a plurality of vectors using a genetic algorithm, the vectors respectively including a plurality of individual values decodable into possible link weights for performing routing in a communication network;
decoding a first vector updated using the genetic algorithm into a first plurality of link weights providing a possible routing of a load through the communication network, the load to be split among a plurality of paths having respective path lengths determined from the first plurality of link weights, at least some of the paths having different path lengths;
partitioning the plurality of vectors into a first group of vectors and a second group of vectors based on routing costs associated with respective ones of the vectors; and
randomly combining a first subset of the first group of vectors and a second subset of the second group of vectors based on a crossover probability to determine an updated plurality of vectors during an iteration of the genetic algorithm.

9. A tangible machine readable medium as defined in claim 8 wherein the operations further comprise:
including the first group of vectors in the updated plurality of vectors;
randomly generating a third group of vectors for inclusion in the updated plurality of vectors; and
randomly setting a first individual value of an updated vector formed by combining one of the first group of vectors and one of the second group of vectors based on a mutation probability to determine the updated plurality of vectors during the iteration of the genetic algorithm.

10. A tangible machine readable medium as defined in claim 8 wherein the operations further comprise:
decoding respective ones of the updated plurality of vectors into respective pluralities of link weights supporting dynamic exponentially-weighted flow splitting after iterations of the genetic algorithm;
determining a dynamic exponentially-weighted flow splitting routing cost associated with respective ones of the pluralities of link weights; and
when a processing convergence is detected, selecting a first plurality of link weights associated with a minimum dynamic exponentially-weighted flow splitting routing cost for performing dynamic exponentially-weighted flow splitting routing in the communication network.

11. A tangible machine readable medium as defined in claim 8 wherein the operations further comprise:
incrementing a link weight of a first plurality of link weights decoded from the first vector;
determining whether incrementing the link weight of the first plurality of link weights improved a first dynamic exponentially-weighted flow splitting routing cost associated with the first plurality of link weights;
if the first dynamic exponentially-weighted flow splitting routing cost is improved, again incrementing the link weight of the first plurality of link weights and determining whether the first dynamic exponentially-weighted flow splitting routing cost is improved; and
if the first dynamic exponentially-weighted flow splitting routing cost is not improved, incrementing other link weights of the first plurality of link weights and determining whether associated dynamic exponentially-weighted flow splitting routing costs are improved until no improvement is observed after examining a number of link weights of the first plurality of link weights.

12. A tangible machine readable medium as defined in claim 8 wherein the operations further comprise:
scaling individual values included in the first vector by a scale factor; and
rounding the scaled individual values to nearest integer values to determine respective link weights.

13. An apparatus to determine link weights for routing in a communication network, the apparatus comprising:
a processor to iteratively update a plurality of vectors using a genetic method, the vectors including respective pluralities of individual values decodable into possible link weights; and
a weight decoder to:
decode the plurality of vectors updated by the processor into respective pluralities of link weights providing respective pluralities of possible solutions to route loads through the communication network, the link weights supporting dynamic exponentially-weighted flow splitting; and
determine dynamic exponentially-weighted flow splitting routing costs associated respectively with the pluralities of link weights, the processor to partition the vectors for subsequent updating based on the dynamic exponentially-weighted flow splitting routing costs.

14. The apparatus as defined in claim 13 wherein the processor is to update the vectors by:
partitioning the vectors into a first group of vectors and a second group of vectors based on the dynamic exponentially-weighted flow splitting routing costs; and
randomly combining a first subset of the first group of vectors and a second subset of the second group of vectors based on a crossover probability.

15. The apparatus as defined in claim 14 wherein the processor is to update the vectors by:
including the first group of vectors in the plurality of vectors;
randomly generating a third group of vectors to include in the plurality of vectors; and
randomly setting a first individual value of an updated vector formed by combining one of the first group of vectors and one of the second group of vectors based on a mutation probability.

16. The apparatus as defined in claim 13 wherein, when a convergence is detected, the weight decoder is to select a first plurality of link weights associated with a minimum dynamic exponentially-weighted flow splitting routing cost to perform dynamic exponentially-weighted flow splitting routing in the communication network.

17. The apparatus as defined in claim 13 further comprising a weight updater to:
   increment a first link weight of a first plurality of link weights from the pluralities of link weights, the first plurality of link weights decoded from a first updated vector after decoding the updated plurality of vectors into respective pluralities of link weights;
   determine whether incrementing the first link weight improved a first dynamic exponentially-weighted flow splitting routing cost associated with the first plurality of link weights;
   if the first dynamic exponentially-weighted flow splitting routing cost is improved, again increment the first link weight and determine whether the first dynamic exponentially-weighted flow splitting routing cost is improved; and
   if the first dynamic exponentially-weighted flow splitting routing cost is not improved, iteratively increment a next link weight of the first plurality of link weights and determine whether an associated dynamic exponentially-weighted flow splitting routing cost is improved until no improvement is observed after examining a number of link weights of the first plurality of link weights.

18. The apparatus as defined in claim 13 wherein the weight decoder is to:
   scale individual values included in the vectors by a scale factor; and
   round the scaled individual values to respective nearest integer values to determine respective link weights.

* * * * *